United States Patent
Aftkhar et al.

(10) Patent No.: US 11,657,466 B2
(45) Date of Patent: May 23, 2023

(54) UTILIZING MACHINE LEARNING TO PREVENT INTELLECTUAL PROPERTY ISSUES FOR CONTENT DURING DIFFERENT STAGES OF A PROJECT LIFECYCLE

(71) Applicant: Accenture Global Solutions Limited, Dublin (IE)

(72) Inventors: Mohamed Aftkhar, Plano, TX (US); Teresa Sheausan Tung, Tustin, CA (US); Kirby James Linvill, Santa Clara, CA (US); Malek Ben Salem, Falls Church, VA (US); Zhijie Wang, Fremont, CA (US); Aritomo Shinozaki, San Jose, CA (US); Steven R. Roberts, Burlingame, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/008,391

(22) Filed: Aug. 31, 2020

(65) Prior Publication Data
US 2021/0233190 A1 Jul. 29, 2021

Related U.S. Application Data

(60) Provisional application No. 62/965,449, filed on Jan. 24, 2020.

(51) Int. Cl.
*G06Q 50/18* (2012.01)
*G06N 20/00* (2019.01)

(52) U.S. Cl.
CPC .......... *G06Q 50/184* (2013.01); *G06N 20/00* (2019.01)

(58) Field of Classification Search
CPC .............................. G06Q 50/184; G06N 20/00
(Continued)

(56) References Cited

U.S. PATENT DOCUMENTS

| 10,347,019 B2 | 7/2019 | Puri et al. | |
| 2015/0280921 A1* | 10/2015 | Geoffrey | G06F 21/32 713/176 |

(Continued)

FOREIGN PATENT DOCUMENTS

| CA | 2938530 A1 * | 2/2017 | ............. G06F 21/62 |

OTHER PUBLICATIONS

S. A. Zachariah, D. Rajasekar, L. Agilandeeswari and M. Prabukumar, "IoT-based real time signature authentication and transfer from document to document with DNA encryption," 2016 2nd International Conference on Next Generation Computing Technologies (NGCT), 2016, pp. 01-08, (Year: 2016).*

(Continued)

*Primary Examiner* — Michael Young
(74) *Attorney, Agent, or Firm* — Harrity & Harrity, LLP

(57) ABSTRACT

A device may receive content data identifying content created by users and metadata associated with the content. The device may receive rules data identifying rules associated with utilization of the content. The device may utilize the metadata to generate digital DNA signatures for the content in near-real time. The device may store, in a repository, the rules data, the content, the digital DNA signatures, and relationships between the digital DNA signatures. The device may receive, from a client device, new content that is generated based on particular content of the content data and new metadata associated with the new content. The device may utilize the new metadata to generate a new digital DNA signature for the new content. The device may process the new digital DNA signature, the rules data, and (Continued)

the digital DNA signatures to determine whether the new content violates one or more rules of the rules data.

20 Claims, 16 Drawing Sheets

(58) Field of Classification Search
USPC .......................................................... 705/310
See application file for complete search history.

(56) References Cited

U.S. PATENT DOCUMENTS

| | | | |
|---|---|---|---|
| 2017/0046709 A1* | 2/2017 | Lee | G06Q 20/401 |
| 2017/0061659 A1 | 3/2017 | Puri et al. | |
| 2018/0144067 A1 | 5/2018 | Chatelain et al. | |
| 2018/0285996 A1* | 10/2018 | Ma | H04L 9/3297 |
| 2021/0166245 A1* | 6/2021 | Novotny | G06Q 20/3829 |

OTHER PUBLICATIONS

BlackDuck by Synopsys, http://www.blackduck.com (last visited Aug. 31, 2020).

* cited by examiner

UTILIZING MACHINE LEARNING TO PREVENT INTELLECTUAL PROPERTY ISSUES FOR CONTENT DURING DIFFERENT STAGES OF A PROJECT LIFECYCLE

CROSS-REFERENCE TO RELATED APPLICATION

This patent application claims priority to U.S. Provisional Patent Application No. 62/965,449, filed on Jan. 24, 2020, and entitled "UTILIZING POLICY ENFORCEMENT AND MODELS TO PREVENT INTELLECTUAL PROPERTY ISSUES FOR CONTENT DURING DIFFERENT STAGES OF A PROJECT LIFECYCLE FOR THE CONTENT." The disclosure of the prior Application is considered part of and is incorporated by reference into this patent application.

BACKGROUND

Intellectual property is a category of property that includes intangible creations of the human intellect. Common types of intellectual property include copyrights, patents, trademarks, and trade secrets. Intellectual property rights allow creators, or owners, of intellectual property to benefit from the work or investment expended to obtain the intellectual property.

SUMMARY

In some implementations, a method includes receiving, by a device, content data identifying content created by users and metadata associated with the content; receiving, by the device, rules data identifying rules associated with utilization of the content; utilizing, by the device, the metadata to generate digital DNA signatures for the content in near-real time; storing, by the device and in a repository, the rules data, all of the content of the content data, the digital DNA signatures, and relationships between the digital DNA signatures; receiving, by the device and from a client device, new content that is generated based on particular content of the content data and new metadata associated with the new content; utilizing, by the device, the new metadata to generate a new digital DNA signature for the new content; processing, by the device, the new digital DNA signature, the rules data, and the digital DNA signatures, with a machine learning model, to determine whether the new content violates one or more rules of the rules data; and performing, by the device, one or more actions based on whether the new content violates the one or more rules of the rules data.

In some implementations, a device includes one or more memories; and one or more processors, communicatively coupled to the one or more memories, configured to: receive content data identifying content created by users and metadata associated with the content; receive rules data identifying rules associated with utilization of the content; utilize the metadata to generate digital DNA signatures for the content in near-real time; utilize the metadata and the content data to generate digital identifiers for the content; associating the digital identifiers with corresponding digital DNA signatures; store, in a repository, the rules data, all of the content of the content data, the digital DNA signatures, and the digital identifiers; receive, from a client device, new content that is generated based on particular content of the content data and new metadata associated with the new content; utilize the new metadata to generate a new digital DNA signature for the new content; process the new digital DNA signature, the rules data, the digital DNA signatures, and the digital identifiers, with a machine learning model, to determine whether the new content violates one or more rules of the rules data; and perform one or more actions based on whether the new content violates the one or more rules of the rules data.

In some implementations, a non-transitory computer-readable medium storing instructions includes one or more instructions that, when executed by one or more processors, cause the one or more processors to: store, in a repository: content data identifying content and metadata associated with the content, rules data identifying rules associated with utilization of the content, and digital DNA signatures, for the content, that are generated in near-real time based on the metadata; receive, from a client device, new content that is generated based on particular content of the content data and new metadata associated with the new content; utilize the new metadata to generate a new digital DNA signature for the new content; process the new digital DNA signature, the rules data, and the digital DNA signatures, with a machine learning model, to determine whether the new content violates one or more rules of the rules data; and perform one or more actions based on whether the new content violates the one or more rules of the rules data.

DETAILED DESCRIPTION

Figure 1A:
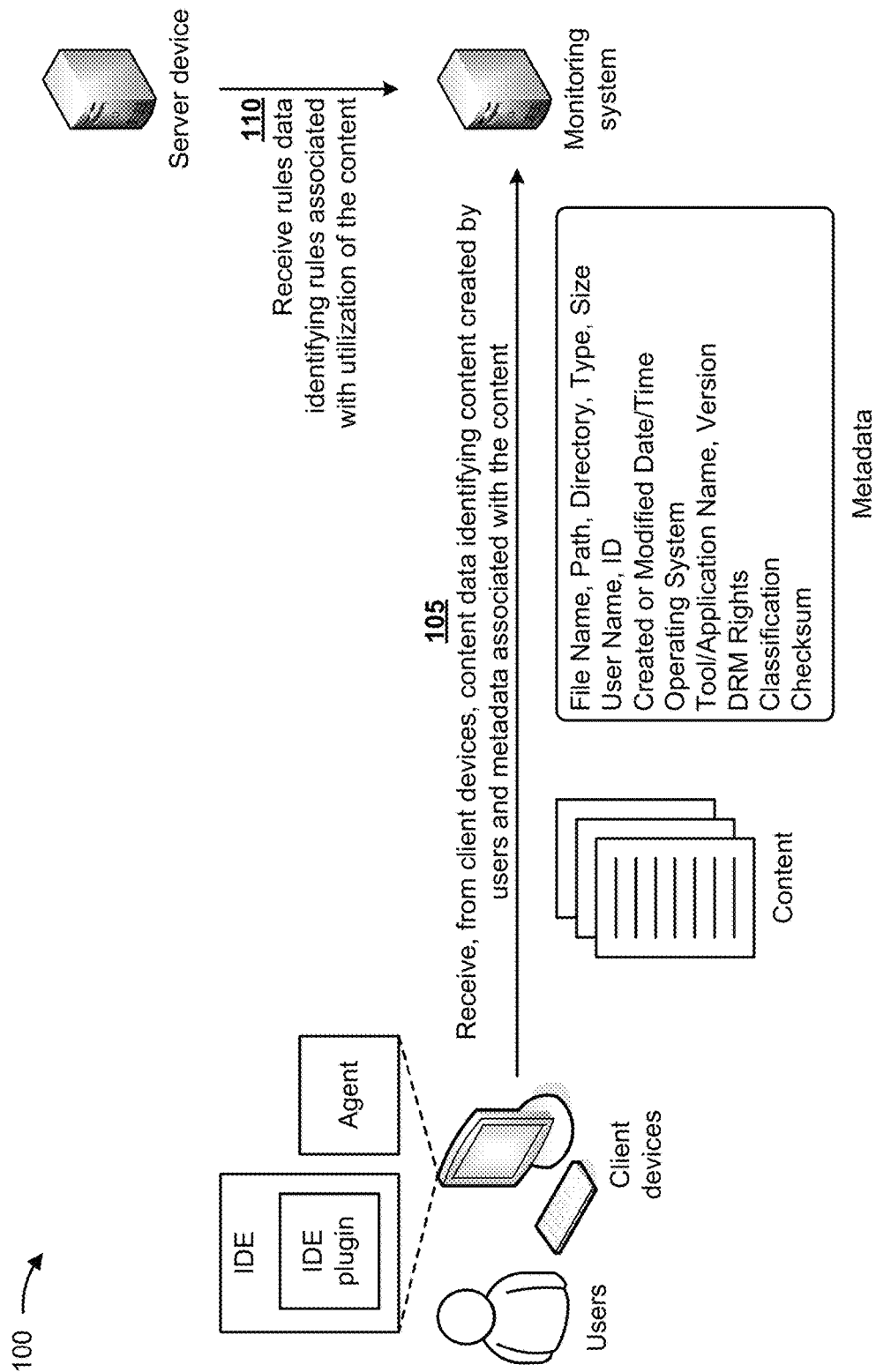
FIGS. 1A-1G are diagrams of one or more example implementations described herein.

The following detailed description of example implementations refers to the accompanying drawings. The same reference numbers in different drawings may identify the same or similar elements.

Intellectual property issues may include intellectual property theft, intellectual property leaks, intellectual property contamination, endpoint intellectual property infringement, and/or the like. Intellectual property theft may include an entity deliberately trying to steal intellectual property by either embedding restricted intellectual property into a file and then downloading and/or consuming the file, by renaming the file, by concealing the file and then downloading the file, and/or the like.

An intellectual property leak may include an entity deliberately or inadvertently consuming and/or distributing intellectual property. For example, the entity may believe that the intellectual property includes components A and B (e.g., based on a bill of materials), but may deliberately or inadvertently distribute components A, B, X, and Y, where the entity is not authorized to utilize intellectual property associated with components X and Y.

Intellectual property contamination may include an entity deliberately or inadvertently introducing unwanted intellectual property into a product that makes the product susceptible and vulnerable to attacks, viruses, and/or the like. Endpoint intellectual property infringement may include an entity deliberately or inadvertently introducing intellectual property components that were not registered as part of an initial solution (e.g., an original executable file is replaced with an imposter file, additional executable files are included in a solution executing on an endpoint device, and/or the like).

An intellectual property issue, whether deliberate or inadvertent, may occur at various stages of a development lifecycle. Further, due to the relative ease at which digital content can be copied, stored, transmitted, and/or the like, digital content (e.g., software, source code, register transfer language (RTL) files in semiconductor design, computer aided design (CAD) files, other files that produced as part of a product design and/or solution, and/or the like) is particularly susceptible to the occurrence of intellectual property issues. Such theft may result in being sued for intellectual property infringement, paying royalties for the infringement, and/or the like. Current tools may enable determination of intellectual property issues at various stages of a development lifecycle for content, but are prone to missing potential intellectual property issues due to obfuscating a use of the content. Current tools are also prone to missing potential intellectual property issues for content unrelated to software code, such as hardware development, CAD files and drawings, and/or the like, due to such obfuscation. Thus, current tools are ineffective and waste resources (e.g., processing resources, memory resources, communication resources), networking resources, human resources, and/or the like associated with managing content, policing intellectual property infringement by the content, handling legal issues associated with infringing content, and/or the like.

Some implementations described herein provide a monitoring system that utilizes policy enforcement and a machine learning model to prevent intellectual property issues for content during different stages of a project lifecycle for the content, as well as when the content is packaged and bundled into other solutions, deployed into endpoint devices and/or products, and/or the like. For example, the monitoring system may receive content data identifying content created by a user and metadata associated with the content. The monitoring system may obtain rules data identifying rules associated with utilization of the content. The monitoring system may generate a digital DNA signature for the content based on the metadata.

When new content that is generated based on the content is received by the monitoring system, the monitoring system may generate a new digital DNA signature for the new content based on metadata associated with the new content. The monitoring system may utilize a machine learning model to process the new digital DNA signature, the rules data, and the digital DNA signature to determine whether the new content violates one or more rules of the rules data.

In this way, the monitoring system prevents created content from experiencing intellectual property issues during different stages of a project lifecycle for the content. Thus, the monitoring system may conserve computing resources (e.g., processing resources, memory resources, communication resources), networking resources, human resources, and/or the like that would otherwise be wasted in managing content, policing intellectual property issues associated with the content, handling legal issues associated with the intellectual property issues, and/or the like.

FIGS. 1A-1G are diagrams of one or more example implementations 100 described herein. As shown in FIGS. 1A-1G, a client device is associated with a monitoring system and a server device. The client device may include a mobile device, a computer, and/or the like that is associated with a user that utilizes the client device to create content.

The server device may include one or more computing devices that provide external tools for monitoring content received by the monitoring system. The server device may store rules data identifying rules associated with utilization of the content. The monitoring system may include one or more devices that utilize policy enforcement and a machine learning model to prevent intellectual property issues for content during different stages of a project lifecycle for the content, in a manner described herein.

As shown in FIG. 1A, the client device may include an integrated development environment (IDE), an IDE plugin, and an agent. The IDE may include a component that enables the client device to capture events associated with content (e.g., software) development, CAD drawing tools, circuit layout design tools, and/or the like.

The IDE plugin may include a software component of the IDE that monitors content development activity and edits by the user to content. The IDE plugin may capture different events based on integration capabilities of the IDE, may gather necessary metadata and contextual information, may provide the events to the agent, and/or the like.

The agent may include software that is developed and deployed for the client device. The agent may receive the events from the IDE plugin and may manage transmission of the events to the monitoring system when the client device is connected to the monitoring system. The agent may archive the events (e.g., in a local cache) when the client device is not connected to the monitoring system, and may provide information identifying the events to the monitoring system after connectivity is established between the client device and the monitoring system.

In some implementations, the functionality of the IDE, the IDE plugin, and/or the agent may be integrated and encapsulated within a third party monitoring tool associated with product development processes and environments, checks and balance scripts and/or procedures, workflows, and/or the like.

As further shown in FIG. 1A, and by reference number 105, the monitoring system receives, from client devices, content data identifying content created by users and metadata associated with the content. For example, the monitoring system may receive, from the agent of a client device, content data identifying content created by a user and metadata associated with the content.

In some implementations, the monitoring system receives the content data and the metadata in real time or near-real time with respect to the content being created by the users. A user of a client device may utilize the client device to create the content. The client device may provide the content data and the metadata to the monitoring system as the content is created by the user. Alternatively, and/or additionally, the monitoring system may receive the content data and the metadata periodically (e.g., hourly, daily, weekly, and/or the like), based on an occurrence of an event (e.g., an application executing a save function to save content to a memory associated with the client device, the application performing a copy function to copy content, the application performing a paste function to insert copied content into a document or file, and/or the like), based on providing a request to the client device, and/or the like.

In some implementations, the content data includes information identifying an event associated with the creation of the content by the user of the client device. In some implementations, the event may include the user utilizing the client device to create new content, to modify content, to include previously created content with new content, and/or the like. In some implementations, the content data includes the content created by the user, such as the lines of code entered by the user via a user interface associated with the client device, an object designed by the user (e.g., a circuit layout design, a CAD drawing, and/or the like), and/or the like.

The metadata may include data indicating a parameter associated with the content, data indicating an attribute associated with the content, data indicating a characteristic associated with the content, data indicating an application and/or tool used to create the content, data indicating a user associated with the content, and/or the like. As shown in FIG. 1A, the metadata may include information identifying a file name associated with the content, information identifying a path associated with the content, information identifying a directory associated with the content, information identifying a type of the content (e.g., a text document, an image, an executable file, and/or the like), information identifying a size of the content, information identifying a user name associated with the content (e.g., a user name associated with a user that created the content, a user name associated with a user that modified the content, a user name associated with a user that provided the content to the monitoring system, and/or the like), information identifying an identifier (e.g., an identifier associated with the client devices, an identifier associated with the users, and/or the like), information indicating a data and/or a time at which the content was created and/or modified, information identifying an operating system (e.g., an operating system used to create and/or modify the content), information identifying a name of a tool and/or an application used to create and/or modify the content, information identifying a version associated with the content, information identifying digital rights management (DRM) rights associated with the content, information identifying a classification associated with the content (e.g., a business unit associated with the content, a category associated with the content (e.g., health care, entertainment, data security, and/or the like), and/or the like), information identifying a checksum associated with the content, and/or the like. The above-listed types of metadata are intended to be merely examples of types of metadata that may be used. In practice, the metadata associated with the content may include any one or more of the above-listed types of meta data and/or one or more other types of metadata not listed above.

As shown by reference number 110, the monitoring system receives rules data identifying rules and/or policies associated with utilization of the content. The rules may include a licensing rule and/or policy (e.g., a rule and/or policy indicating a requirement, a restriction, and/or the like associated with licensing the content), a content restriction rule and/or policy (e.g., a rule and/or policy indicating whether the content may contain content created by another user, content identified as being sensitive content, and/or the like), an entity rule and/or policy (e.g., a rule and/or policy established by an entity associated with the user and/or the content), a content reuse rule and/or policy (e.g., a rule and/or policy indicating whether the content may be included in other content), and/or the like.

Figure 1B:
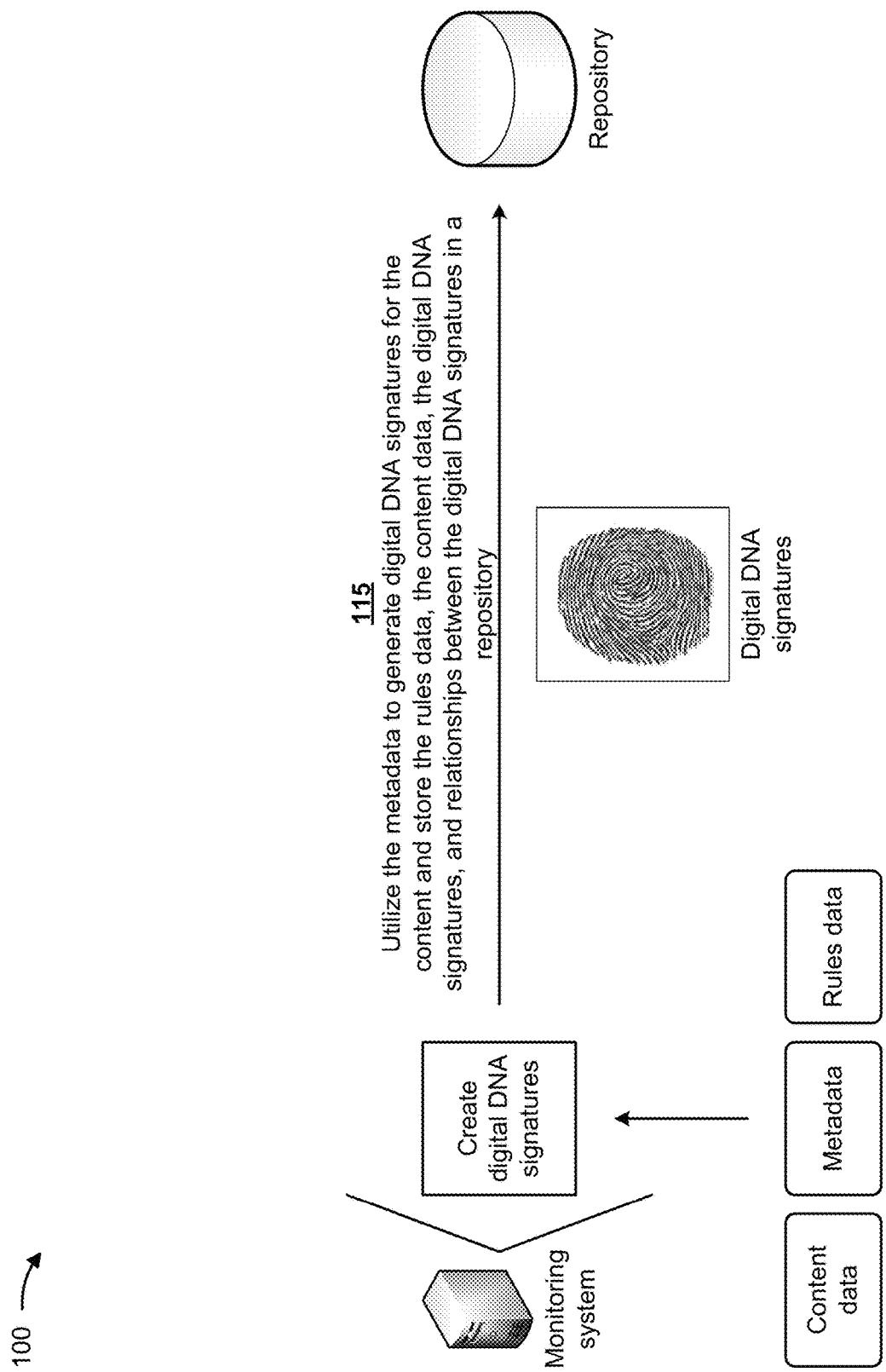

As shown in FIG. 1B, and by reference number 115, the monitoring system utilizes the metadata to generate digital DNA signatures for the content and stores the rules data, the content data, the digital DNA signatures, and relationships between the digital DNA signatures in a repository. The digital DNA signature generated for particular content may include information that uniquely identifies the particular content, information that enables the monitoring system to determine whether the particular content (and/or a portion of the particular content) is included in other content, and/or the like.

In some implementations, the digital DNA signature is generated based on one or more portions of the metadata and/or one or more portions of the content data. For example, the particular content may include a plurality of lines of code and the monitoring system may generate the digital DNA signature based on computing a hash of one or more portions of the metadata and/or one or more lines of the plurality of lines of code included in the content data.

In some implementations, the digital DNA signature is generated in real-time (or near-real-time). The client device may provide the content data including content generated by the user and the metadata to the monitoring system based on the user utilizing the client device to create the content. The monitoring system may generate the digital DNA signature based on receiving the content data and the metadata from the client device.

In some implementations, the monitoring system generates a plurality of digital DNA signatures for the particular content. The monitoring system may identify a first portion of the content data and/or a first portion of the metadata associated with a first portion of the particular content (e.g., a portion of the particular content created by a first user). The monitoring system may identify a second portion of the content data and/or a second portion of the metadata associated with a second portion of the particular content (e.g., a portion of the particular content created by a second user). The monitoring system may generate a first digital DNA signature associated with the first portion of the particular content based on the first portion of the data content and/or the first portion of the metadata. The monitoring system may generate a second digital DNA signature associated with the second portion of the particular content based on the second portion of the data content and/or the second portion of the metadata.

The monitoring system may determine relationships between the digital DNA signatures based on generating the digital DNA signatures. The relationships may indicate relationships between content associated with the digital DNA signatures. For example, the relationships may indicate that content created by a first user includes content created by a second user, that content includes content created by multiple users, that first content and second content were created by the same user, and/or the like.

As an example, a first user may create a first portion of code for an application and a second user may create a second portion of code for the application. The monitoring system may generate a first digital DNA signature associated with the first portion of code, a second digital DNA signature associated with the second portion of code, a third digital DNA signature associated with all the code for the application (e.g., the first portion of code and the second portion of code).

The monitoring system may determine a relationship between the first digital DNA signature and the second digital DNA signature based on the first digital DNA signature and the second digital DNA signature being included in the code for the application. The monitoring system may determine a relationship between the first digital DNA signature and the third digital DNA signature based on the first portion of the code being included in the code for the application. The monitoring system may determine a relationship between the second digital DNA signature and the third digital DNA signature based on the second portion of the code being included in the code for the application.

In some implementations, the monitoring system determines that a digital DNA signature is not related to any other digital DNA signature. As an example, the monitoring system may determine that a digital DNA signature is associated with content created by a single user, that the digital DNA signature is associated with content that is not associated with other content, and/or the like. The monitoring system may determine that the digital DNA signature is not related to any other digital DNA signature based on the digital DNA signature being associated with content created by a single user, based on the digital DNA signature being associated with content that is not associated with other content, and/or the like.

The monitoring system may store the rules data, the content data, the metadata, the digital DNA signatures, and information identifying the relationships between the digital DNA signatures in the repository based on generating the digital DNA signatures. The repository may include a data structure (e.g., a database, a table, a list, and/or the like) stored on one or more devices associated with the monitoring system.

In some implementations, the repository includes a lineage repository. The lineage repository may include a data structure that stores content lineage information, content origination information, content referencing information, and/or the like. For example, the lineage repository may store the information identifying the relationships between the digital DNA signatures, information identifying versions of the content, information identifying a user associated with creating the content, information identifying a date and/or a time that the content was created, information identifying a user associated with modifying the content, information identifying a data and/or a time that the content was modified, information identifying other content that includes the content, and/or the like.

In some implementations, the repository includes a metadata repository. The metadata repository may include a data structure that stores the metadata, information identifying a characteristic associated with the content, a memory location associated with the content, information identifying a device on which the content is stored, a snippet of code (e.g., lines of code that are not permitted to be included in content) obtained from an external source (e.g., the server device), and/or the like.

Figure 1C:
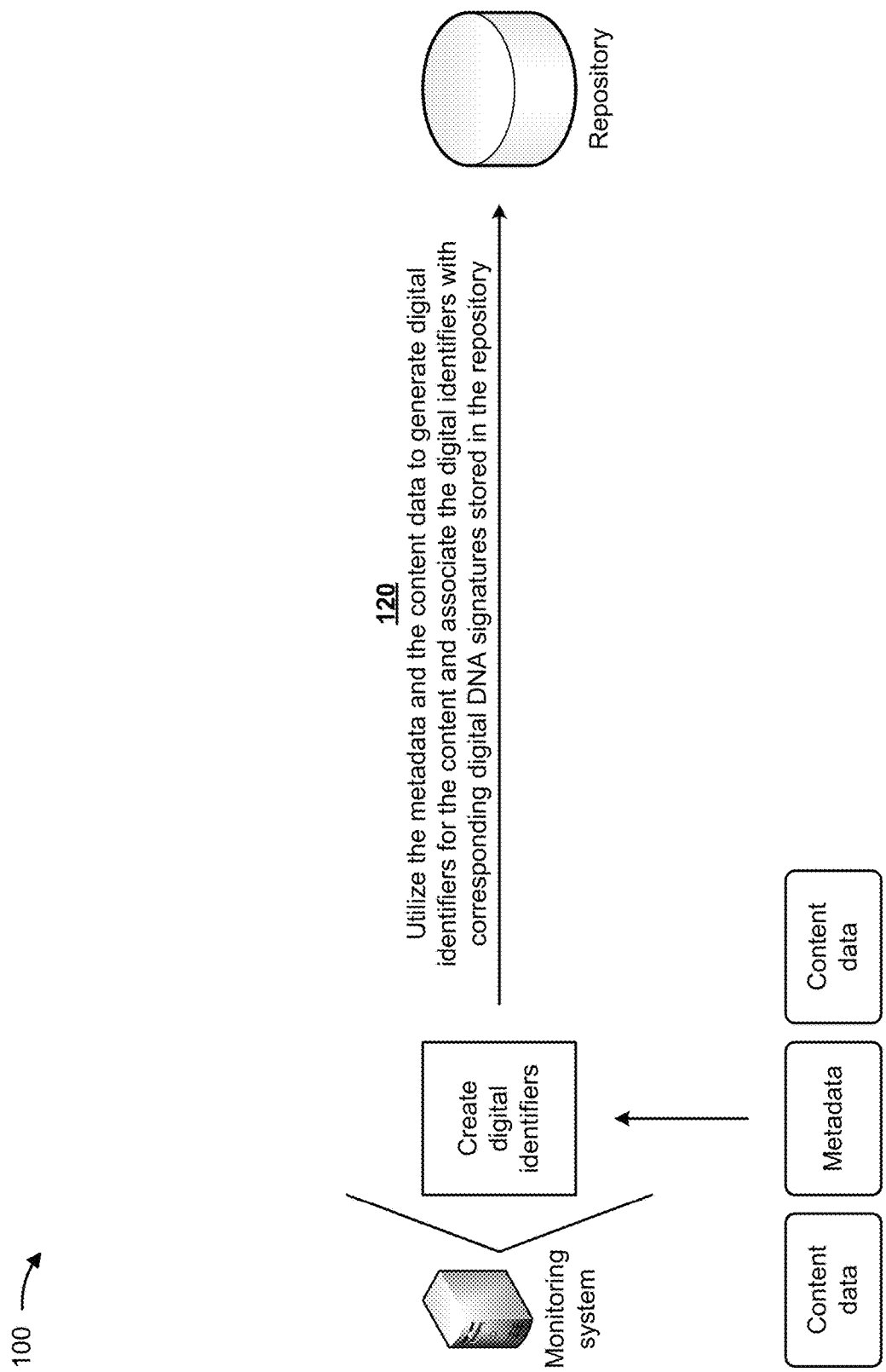

As shown in FIG. 1C, and by reference number 120, the monitoring system utilizes the metadata and the content data to generate digital identifiers for the content and associates the digital identifiers with corresponding digital DNA signatures in the repository. A digital identifier may include information generated based on the content with which the content data and/or the metadata is associated. For example, the content data for particular content may include one or more portions of the particular content. The monitoring system may extract the one or more portions of the particular content from the content data and may generate a digital identifier associated with the particular content based on the one or more portions of the particular content.

In some implementations, the monitoring system generates the digital identifier by applying an algorithm (e.g., a hashing algorithm, an encryption algorithm, and/or the like) to the one or more portions of the particular content. In some implementations, the algorithm causes the digital identifier generated based on the one or more portions of the particular content to be the same as a digital identifier generated based on other content when the one or more portions of the particular content are the same as the other content. Similarly, the algorithm may cause the digital identifier generated based on the one or more portions of the particular content to be similar to the digital identifier generated based on the other content when the one or more portions of the particular content are similar to the other content.

Figure 1D:
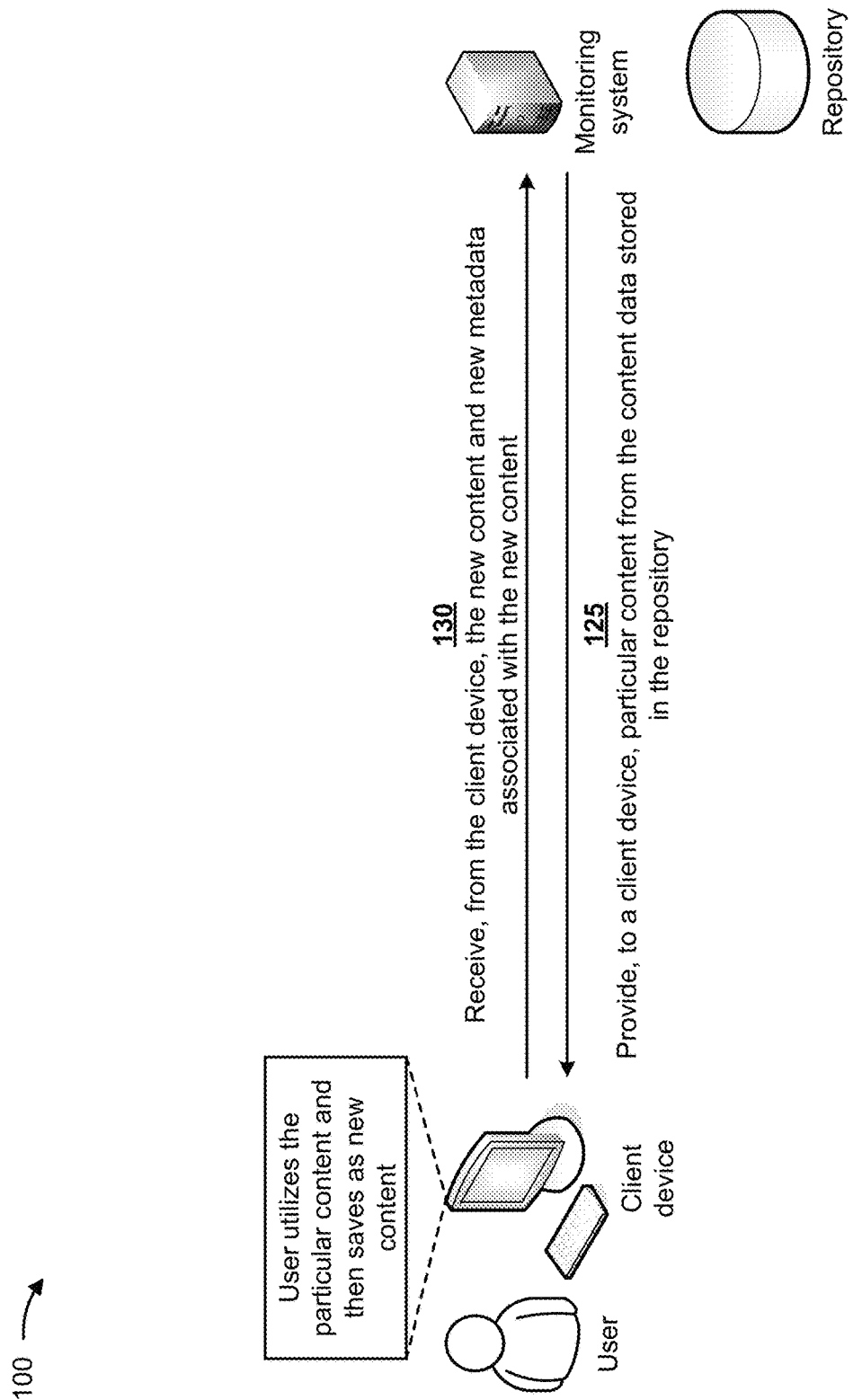

As shown in FIG. 1D, and by reference number 125, the monitoring system provides, to a client device, particular content from the content data stored in the repository. The monitoring system may provide the particular content to the client device based on receiving a request from the client device. For example, a user (e.g., a software developer) may utilize the client device to create a new file based on a template (e.g., particular content) stored in a memory associated with the monitoring system (e.g., a memory of the monitoring system, the repository, the server device, and/or the like). The user may create the new file by saving the template under a new name, by copying a portion of the template into another file, and/or the like. The client device may provide a request for the template to the monitoring system. The monitoring system may provide the template to the client device based on the request.

As shown in FIG. 1D, the user utilizes the particular content and then saves the content in which the particular content was used as new content. For example, the user may utilize the template received from the monitoring system to create the new file. The client device (e.g., the IDE plugin) may capture new metadata for the new file and may generate a record indicating that particular content was utilized to create the new file based on the user saving the content in which the particular content was used as the new content. The client device may include the record in the new metadata and may provide the new content and the new metadata, including the record, to the monitoring system. As shown by reference number 130, the monitoring system receives, from the client device, the new content and the new metadata associated with the new content.

Figure 1E:
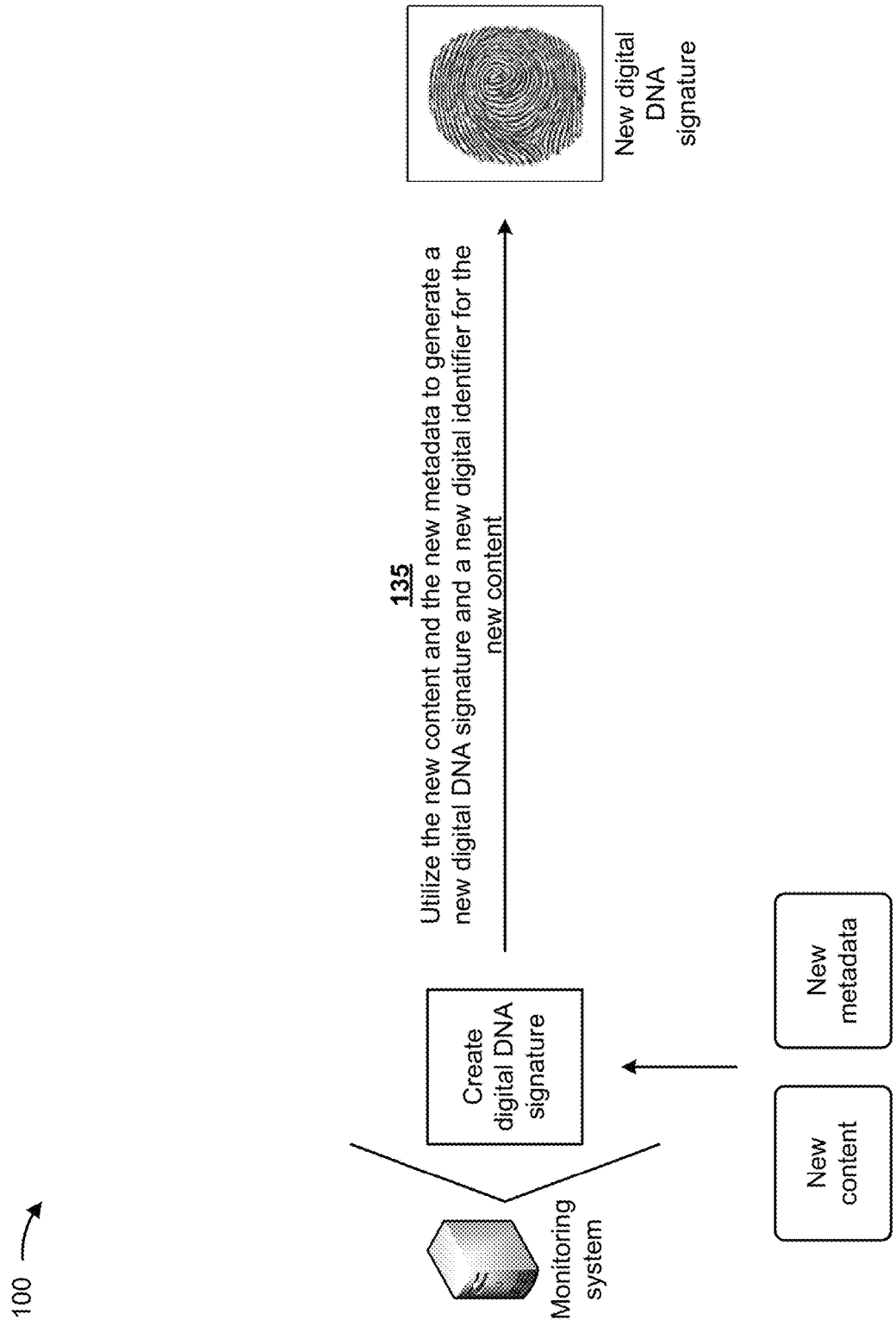

As shown in FIG. 1E, and by reference number 135, the monitoring system utilizes the new content and the new metadata to generate a new digital DNA signature and a new digital identifier for the new content. In some implementations, the monitoring system generates the new digital DNA signature and/or the new digital identifier for the new content in a manner similar to that described above with respect to FIGS. 1B and 1C.

In some implementations, the new digital DNA signature includes a digital DNA signature associated with the particular content. The monitoring system may determine that the particular content was utilized in the new content based on the record included in the new metadata. The monitoring system may include the digital DNA signature associated with the particular content in the new digital DNA signature based on the particular content being utilized in the new content.

Alternatively, and/or additionally, the new digital DNA signature may include information identifying a relationship between the new content and the particular content. The monitoring system may determine that the new content is related to the particular content based on the particular content being utilized in the new content. The monitoring system may include information identifying the relationship in the new digital DNA signature.

Figure 1F:
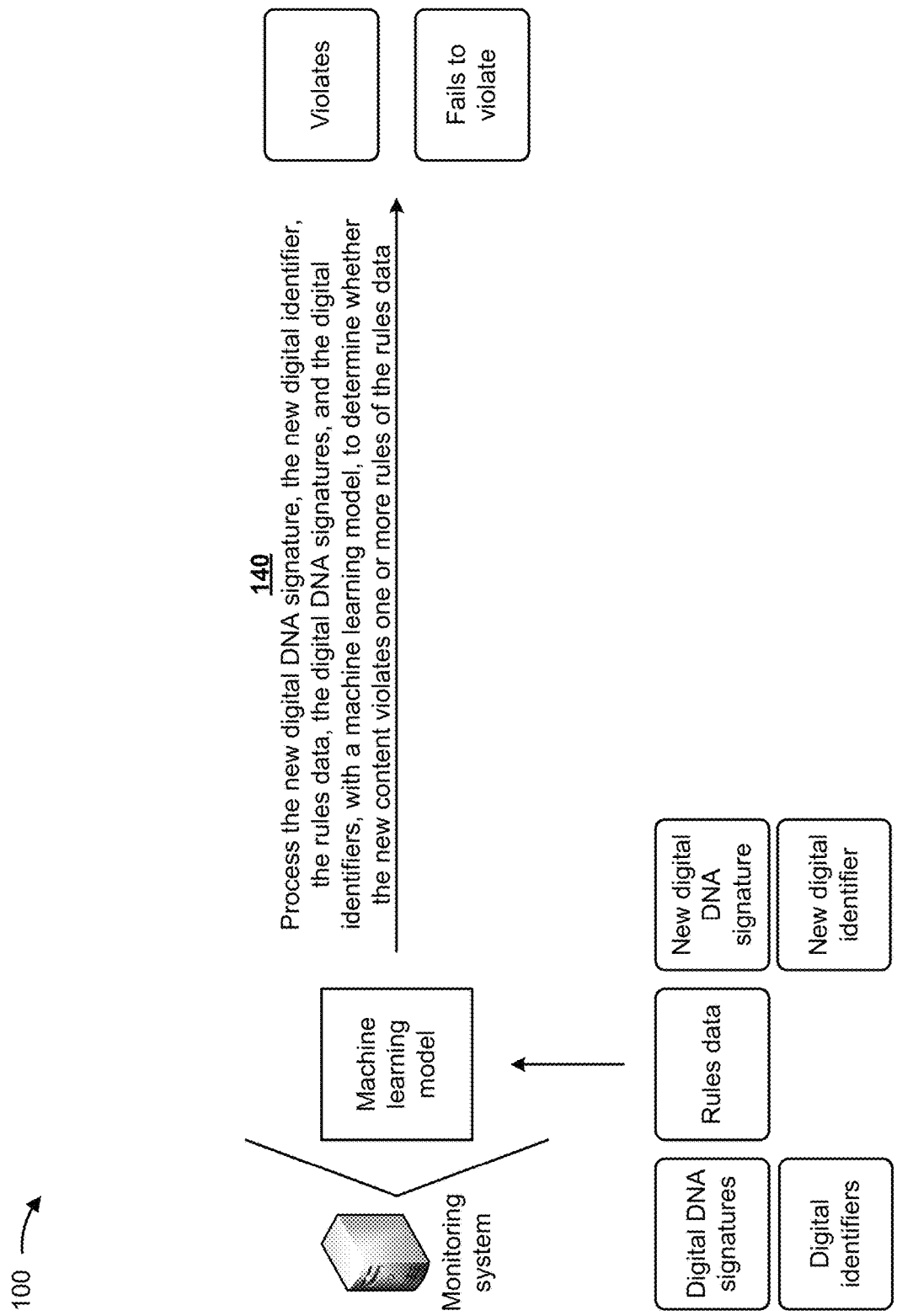

As shown in FIG. 1F, and by reference number 140, the monitoring system processes the new digital DNA signature, the new digital identifier, the rules data, the digital DNA signatures, and the digital identifiers, with a machine learning model, to determine whether the new content violates one or more rules of the rules data. In some implementations, the monitoring system trains the machine learning model to determine whether content violates one or more rules of the rules data. The machine learning model may be trained based on historical data (e.g., historical content that violates a rule, historical content that does not violate a rule, historical rules, and/or the like). The machine learning model may be trained to determine, based on information regarding historical content, information indicating whether the historical content violates a rule and a confidence score that reflects a measure of confidence that the information indicating whether the historical content violates the rule is accurate for the historical content. In some implementations, the machine learning model may be trained in a manner similar to that described below with respect to FIG. 4.

In some implementations, rather than training the machine learning model, the monitoring system may receive a trained machine learning model from another device. For example, the other device may generate the machine learning model based on having trained the machine learning model in a manner similar to that described below with respect to FIG. 4, and may provide the trained machine learning model to the monitoring system (e.g., may pre-load the monitoring system with the trained machine learning model, may receive a request from the monitoring system for the trained machine learning model, and/or the like).

The monitoring system may provide the new digital DNA signature, the rules data, and the digital DNA signatures to the machine learning model as inputs. The machine learning model may process the new digital DNA signature, the rules data, and the digital DNA signatures to determine whether the new content violates one or more rules of the rules data. In some implementations, the machine learning model may process the new digital DNA signature, the rules data, and the digital DNA signatures in a manner similar to that described below with respect to FIG. 4.

In some implementations, the monitoring system determines that the new digital DNA signature is associated with an additional digital DNA signature based on the new digital DNA signature. The monitoring system may analyze the new digital DNA signature and may determine that the new digital DNA signature includes the digital DNA signature associated with the particular content and/or the information identifying the relationship between the particular content and the new content. The monitoring system may determine that the new digital DNA signature is associated with the digital DNA signature associated with the particular content based on the new digital DNA signature including the digital DNA signature associated with the particular content and/or based on the new digital DNA signature including the information identifying the relationship between the particular content and the new content.

In some implementations, the monitoring system determines that the new digital DNA signature is associated with the additional digital DNA signature based on comparing the new digital identifier and the digital identifiers. The new digital identifier may include data generated based on the new content (e.g., a hash of lines of code included in the new content). The monitoring system may determine that the data included in the new digital identifier is similar to data included in a digital identifier of the digital identifiers stored in the repository. The monitoring system may identify a digital DNA signature associated with the digital identifier based on information associated with the digital identifier and stored in the repository. As an example, the repository may store a data structure that includes information identifying the digital identifier as being associated with the digital DNA signature. The monitoring system may determine that the new digital DNA signature is associated with the digital DNA signature based on the digital identifier being associated with the digital DNA signature.

The monitoring system may determine a group of rules associated with the new digital DNA signature based on the rules data. The group of rules may include one or more rules associated with the new digital DNA signature and one or more rules associated with the additional digital DNA signature (e.g., the digital DNA signature associated with the particular content and/or the one or more digital DNA signatures of the digital DNA signatures). The monitoring system may determine whether the new content violates one or more rules of the group of rules based on the new digital DNA signature and the additional digital DNA signature.

As an example, the group of rules may include a rule indicating that the particular content utilized in the new content is restricted content that is not permitted to be utilized in a particular type of content. The monitoring system may determine that the new content comprises the particular type of content based on the new digital DNA signature. The monitoring system may determine that the new content violates the rule based on the new content comprising the particular type of content.

Figure 1G:
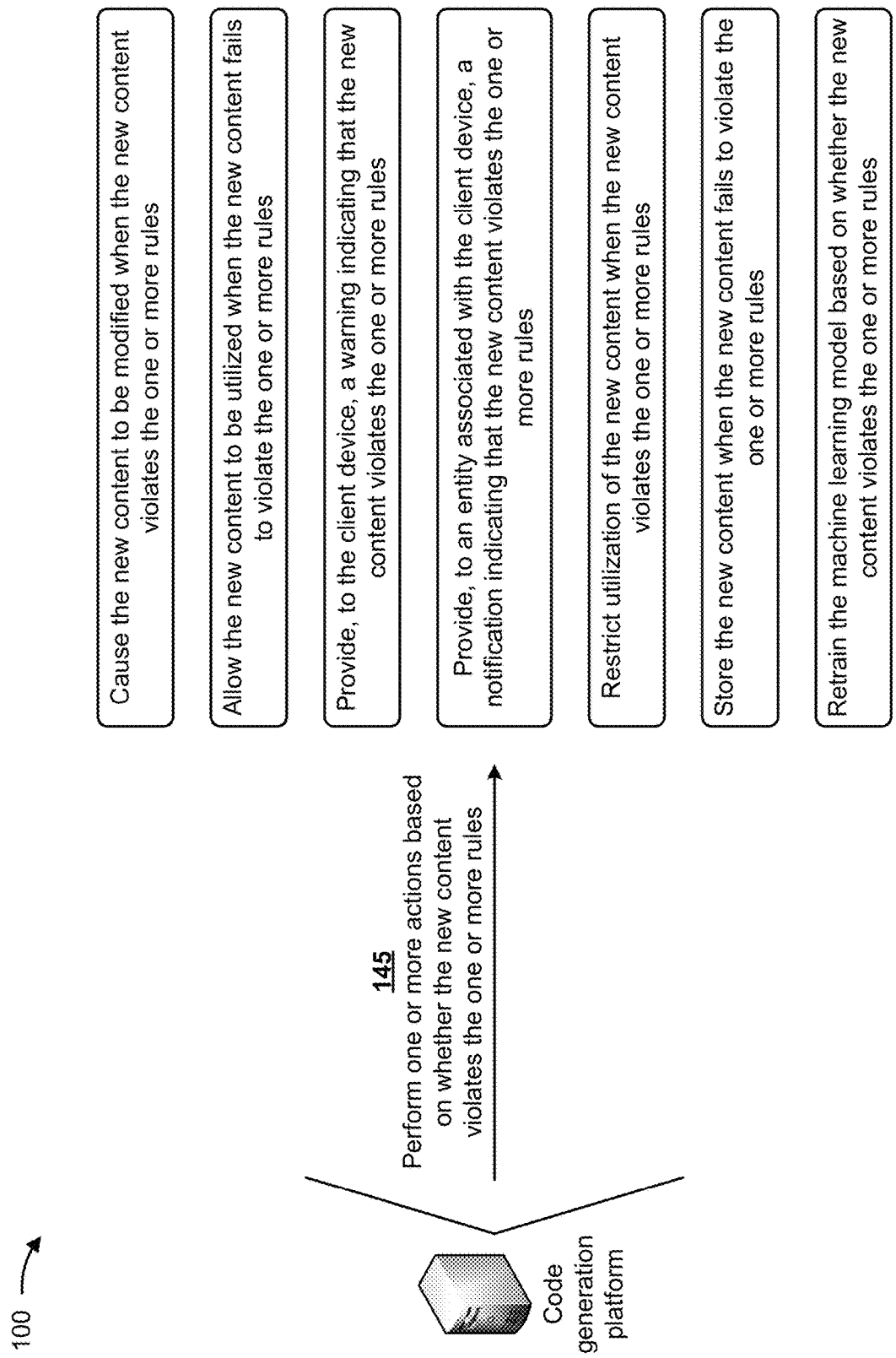

As shown in FIG. 1G, and by reference number 145, the monitoring system performs one or more actions based on whether the new content violates the one or more rules. In some implementations, the one or more actions include causing the new content to be modified when the new content violates the one or more rules. The monitoring system may provide, to the client device, information identifying a violation of the one or more rules (e.g., utilization of a restricted software module) and information instructing the user to modify the new content to correct the violation (e.g., information instructing the user to remove or replace the restricted software module). The user may utilize the client device to modify the new content to correct the violation in accordance with the instructions from the monitoring system.

In some implementations, the monitoring system may automatically modify the new content when the new content violates the one or more rules. For example, the monitoring system may identify a portion of the new content that violates the one or more rules (e.g., the restricted software module). The monitoring system may automatically remove the portion of the new content from the new content and/or replace the portion of the new content with other content based on the portion of the new content violating the one or more rules.

In some implementations, the one or more actions include allowing the new content to be utilized when the new content fails to violate the one or more rules. For example, the monitoring system may allow the new content to move to a next stage of a content development lifecycle, to be distributed to clients, and/or the like based on the new content failing to violate the one or more rules.

In some implementations, the one or more actions include providing, to the client device, a warning indicating that the new content violates the one or more rules. The monitoring system may determine that the new content violates the one or more rules based on an output generated by the machine learning model indicating that the new content violates the one or more rules. The monitoring system may provide a warning to the client device indicating that the new content violates the one or more rules based on the output generated by the machine learning model indicating that the new content violates the one or more rules.

In some implementations, the warning may include violation information. The violation information may include information identifying the one or more rules, information identifying one or more corrective actions, information identifying one or more actions taken by the monitoring system based on the new content violating the one or more rules, and/or the like.

In some implementations, the one or more actions include providing, to an entity associated with the client device, a notification indicating that the new content violates the one or more rules. For example, the monitoring system may provide the violation information to a user associated with the client device, a supervisor of the user associated with the client device, and/or the like.

In some implementations, the one or more actions include restricting utilization of the new content when the new content violates the one or more rules. For example, the monitoring system may implement a security feature that restricts utilization of the new content when the new content violates the one or more rules. The security feature may include causing the new content to be password protected, modifying a permission associated with the new content, including information identifying the new content on a list of restricted content, and/or the like. In this way, the monitoring system may prevent the occurrence of an intellectual property issue associated with the utilization of the new content.

In some implementations, the one or more actions include storing the new content when the new content fails to violate the one or more rules. For example, the monitoring system may store the new content in a data structure associated with content determined not to violate the one or more rules, in a data structure associated with content that is permitted to be distributed (e.g., to a customer) or is permitted to be included in other content, and/or the like.

In some implementations, the one or more actions include retraining the machine learning model based on whether the new content violates the one or more rules. For example, the monitoring system may include the new digital DNA signature and information indicating whether the new digital DNA signature violates the one or more rules in training data used to train the machine learning model. In this way, the monitoring system may increase a quantity of data used to train the machine learning model. By increasing the quantity of data used to train the machine learning model, the monitoring system may increase an accuracy associated with the machine learning model determining whether content violates one or more rules.

In some implementations, the one or more actions include applying a digital DNA signature to a bill of material (BOM). The BOM may be an engineering BOM, a manufacturing BOM, an assembly BOM, a sales BOM, an as configured BOM, an as maintained BOM, and/or the like. The BOM may include information identifying a component included in the BOM. The monitoring system may determine a digital DNA signature for the component. Applying the digital DNA signature to the BOM may enable the monitoring system to quickly and efficiently determine whether components listed on the BOM violate one or more rules. In this way, the monitoring system may prevent the occurrence of an intellectual property issue relating to distributing a component that violates one or more rules.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2A:
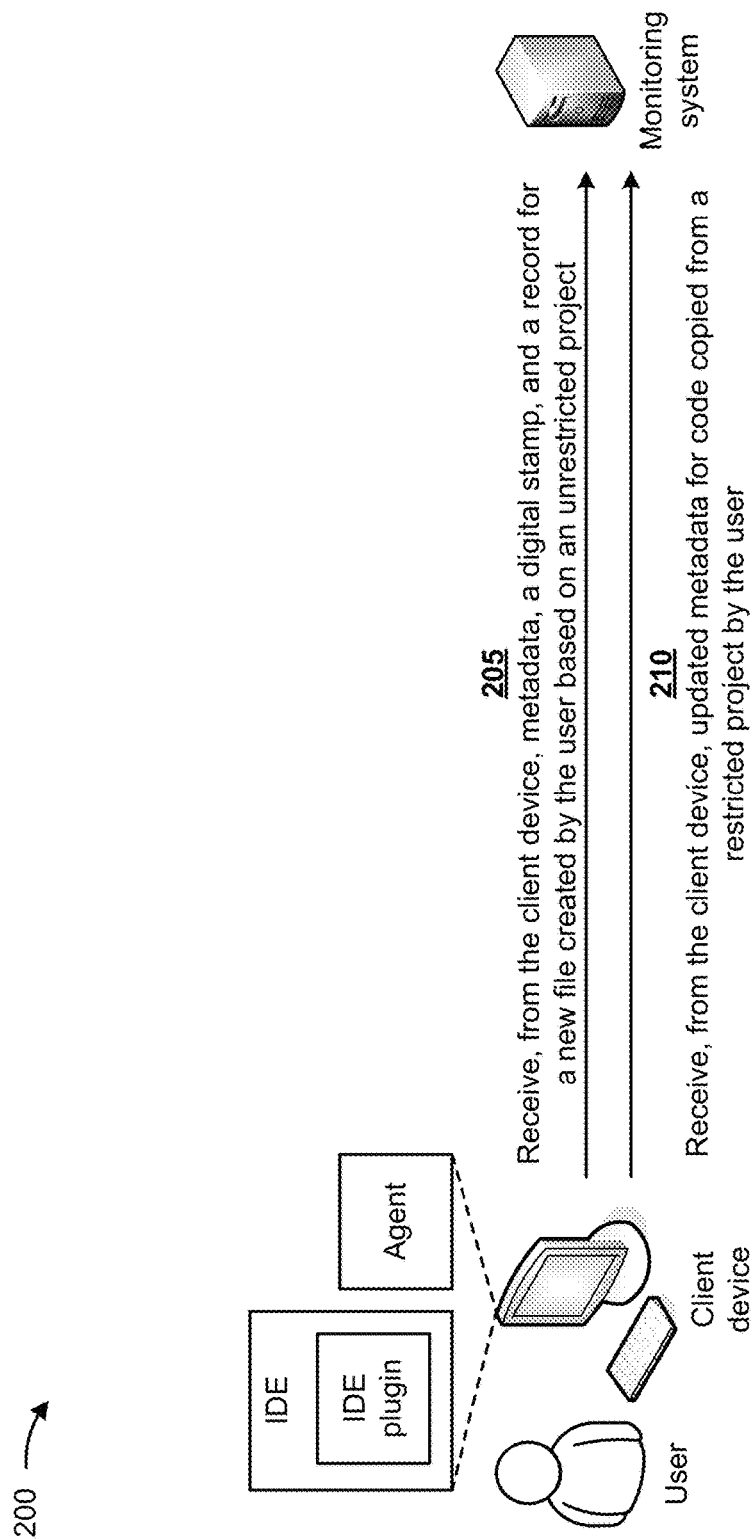
FIGS. 2A-2C are diagrams of one or more example implementations described herein.
Figure 2B:
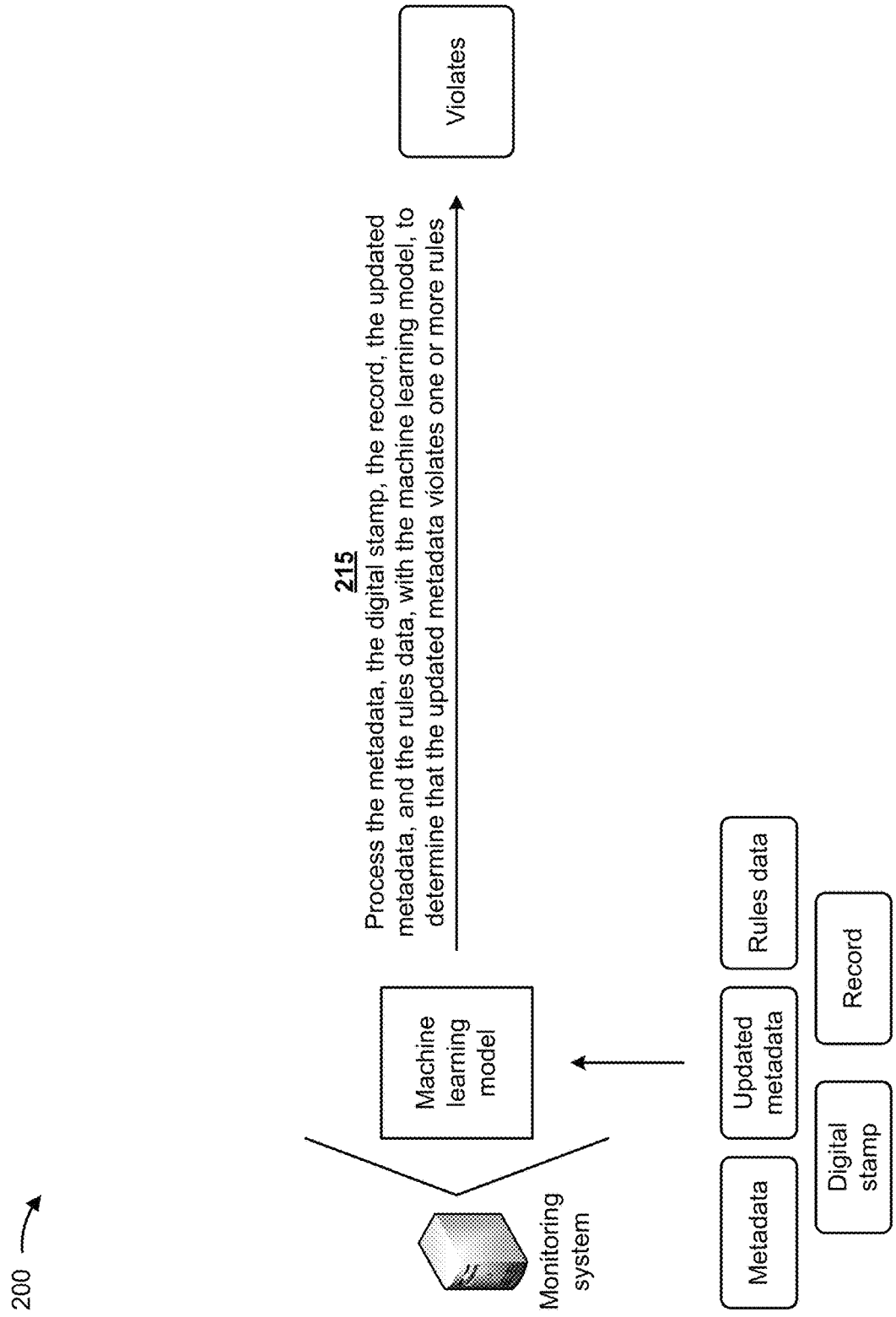
Figure 2C:
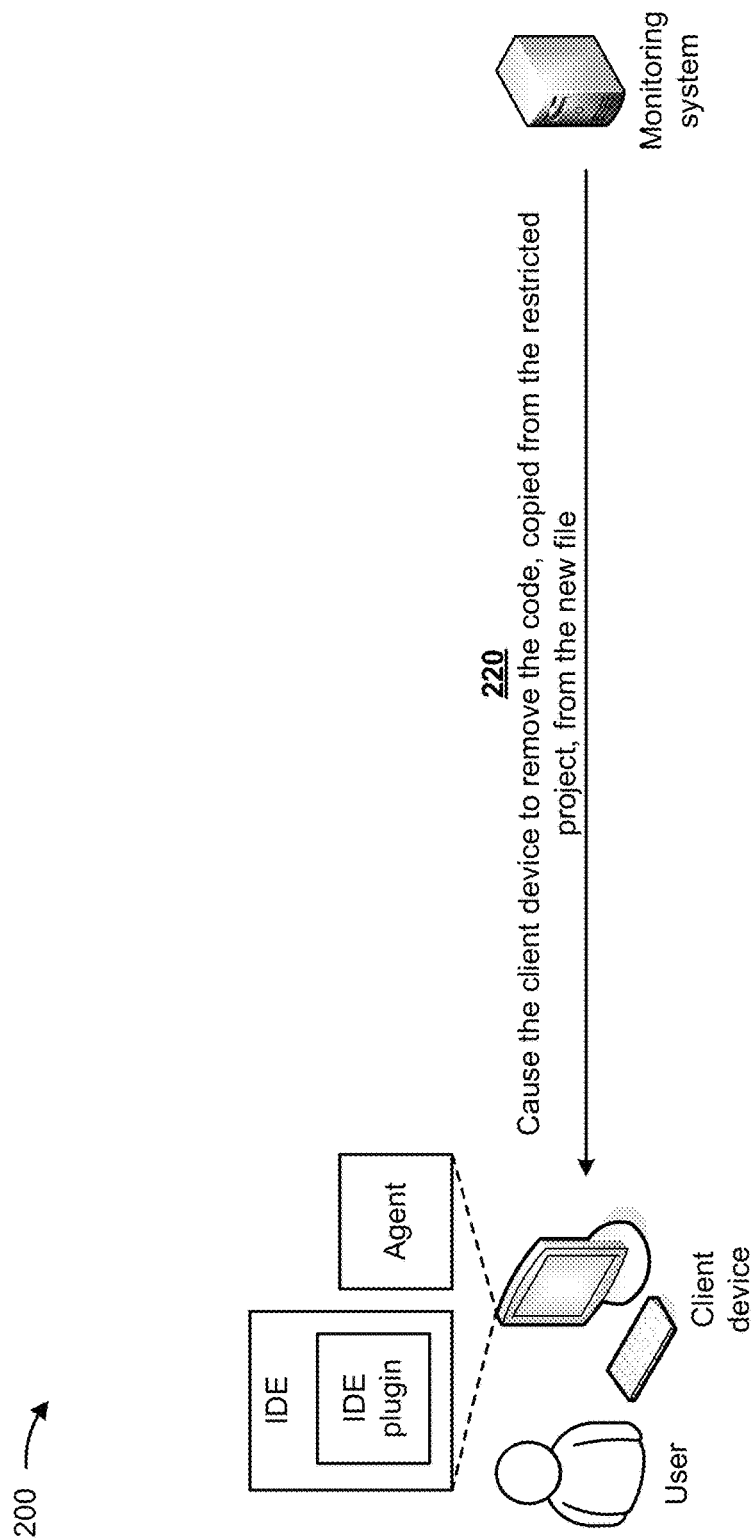

FIGS. 2A-2C are diagrams of one or more example implementations 200 described herein. As shown in FIGS. 2A-2C, a client device is associated with a monitoring system. The client device may include a mobile device, a computer, and/or the like that is associated with a user that utilizes the client device to create content. In some implementations, the client device may be similar to the client device described above with respect to FIG. 1A. The monitoring system may include one or more devices that utilizes policy enforcement and a machine learning model to prevent intellectual property issues for content during different stages of a project lifecycle for the content, in a manner described herein. In some implementations, the monitoring system may be similar to the monitoring system described above with respect to FIG. 1A.

As shown in FIG. 2A, the client device may include an IDE, an IDE plugin, and an agent. The IDE, the IDE plugin, and the agent may be similar to the IDE, the IDE plugin, and the agent described above with respect to FIG. 1A. In some implementations, the functionality of the IDE, the IDE plugin, and/or the agent may be integrated and encapsulated within a third party monitoring tool associated with product development processes and environments, checks and balance scripts and/or procedures, workflows, and/or the like.

As further shown in FIG. 2A, and by reference number 205, the monitoring system receives, from the client device, metadata, a digital stamp, and a record for a new file created by the user based on an unrestricted project. A user (e.g., a developer) may utilize the client device to create a new file based on an unrestricted project. The client device (e.g., the IDE plugin) may capture metadata for the new file and may store the metadata, a digital stamp for the metadata, and a record indicating that the new file was created based on the unrestricted project.

The metadata may include data indicating a parameter associated with the content, data indicating an attribute associated with the content, data indicating a characteristic associated with the content, data indicating an application and/or tool used to create the content, data indicating a user associated with the content, and/or the like. In some implementations, the metadata may be similar to the metadata described above with respect to FIG. 1A.

A digital stamp or signature may include a unique identifier for the metadata (e.g., a secure hash value for the metadata). In some implementations, one or more variables of the metadata may be utilized to generate the digital stamp, and the digital stamp may be utilized for genealogy and tracking purposes. The digital stamp may also be utilized to identify where the new file was created (e.g., a physical location of the client device), when the new file was created, a classification associated with the new file, a configuration management label associated with the new file, and/or the like.

The record may include information indicating that the new file was created based on an unrestricted project. For example, the record may include information identifying the unrestricted project, information indicating a portion of the unrestricted project included in the new file, information identifying a location of the portion of the unrestricted project within the new file, and/or the like.

In some implementations, the monitoring system generates a digital DNA signature for the new file based on receiving the metadata, the digital stamp, and the record for the new file. In some implementations, the monitoring system generates the digital DNA signature in a manner similar to that described above with respect to FIG. 1B.

In some implementations, the monitoring system generates a digital identifier for the new file based on receiving the metadata, the digital stamp, and the record for the new file. In some implementations, the monitoring system generates the digital identifier in a manner similar to that described above with respect to FIG. 1C.

As shown by reference number 210, the monitoring system receives, from the client device, updated metadata for code copied from a restricted project by the user. As an example, the user may utilize the client device to modify the new file to create a modified file. The user may modify the new file by copying a portion of code from a restricted project into the new file. The client device (e.g., the IDE plugin) may record the portion of the code and may record updated metadata associated with the portion of the code. The client device may provide the copied portion of the code and/or the updated metadata to the monitoring system based on recording the portion of the code and/or based on recording the updated metadata.

In some implementations, the monitoring system generates a new digital DNA signature for the modified file based on receiving the updated metadata from the client device. In some implementations, the monitoring system generates a new digital identifier for the modified file based on receiving the portion of the code copied from the restricted project from the client device. In some implementations, the monitoring system generates the new digital DNA signature in a manner similar to that described above with respect to FIG. 1E.

As shown in FIG. 2B, and by reference number 215, the monitoring system processes the metadata, the digital stamp, the record, the updated metadata, and the rules data, with a machine learning model, to determine that the updated metadata violates one or more rules. In some implementations, the machine learning model determines that the updated metadata violates the one or more rules based on the new digital DNA signature, the digital DNA signature associated with the new file, the new digital identifier, and/or the digital identifier associated with the new file, in a manner similar to that described above with respect to FIG. 1F.

As shown in FIG. 2C, and by reference number 220, the monitoring system causes the client device to remove the code, copied from the restricted project, from the new file (e.g., from the modified file). The monitoring system may cause the client device to remove the code from the modified file based on determining that the updated metadata violates the one or more rules. For example, the monitoring system may provide a command to the client device. The client device may receive the command and may remove the code copied from the restricted project from the modified file based on the command. In this way, the monitoring system may automatically prevent the occurrence of an intellectual property issue associated with included code from the restricted project in the new file.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3A:
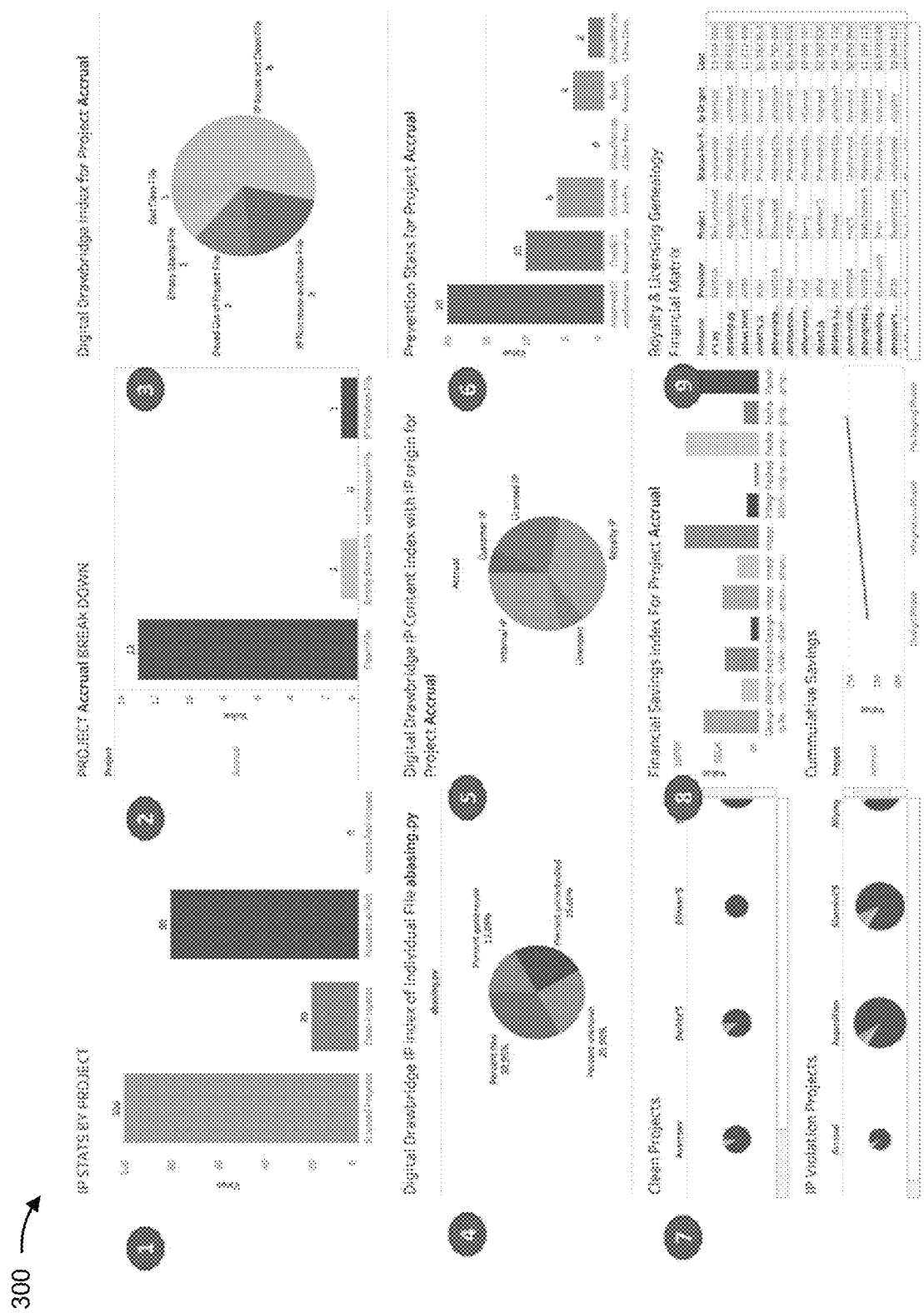
FIGS. 3A and 3B are diagrams of one or more example implementations described herein.
Figure 3B:

FIGS. 3A-3B are diagrams of one or more example implementations 300 described herein. As shown in FIGS. 3A-3B, the monitoring system may include a user interface. The monitoring system may generate a report based on processing digital DNA signatures and/or digital identifiers stored in a repository. The monitoring system may provide the generated report for display via a user interface that may be displayed to a user via a client device.

As shown in FIG. 3A, the report may include information associated with projects, information associated with individual files, information associated with a financial savings related to detecting and/or preventing an occurrence of an intellectual property issue, and licensing information associated with projects and/or files. The information associated with the projects may include information indicating a total quantity of projects analyzed by the monitoring system, information identifying a quantity of projects determined not to violate any rules, information identifying a quantity of projects determined to violate one or more rules, and/or the like. In some implementations, the information associated with projects may be sorted and/or grouped based on a classification associated with the project (e.g., internet security, marketing, and/or the like), a business group associated with the project, and/or the like.

The information associated with the individual files may include information indicating a total quantity of files analyzed by the monitoring system, information identifying a quantity of files determined not to violate any rules, information identifying a quantity of files determined to violate one or more rules, and/or the like. In some implementations, the information associated with the individual files may be sorted and/or grouped based on projects associated with the individual files. In this way, the user may easily and efficiently identify projects having a quantity of files that violate one or more rules that satisfies a threshold quantity (e.g., 10%, 20%, and/or the like). By identifying the projects having the quantity of files that violate the one or more rules that satisfy the threshold quantity, the user may be able to cause one or more actions to be taken, such as identifying a group of users associated with the projects, restricting the group of users from accessing restricted projects, and/or the like.

As shown in FIG. 3B, the report may include information regarding user access patterns and risk factors associated with intellectual property issues associated with a project and/or a file. The monitoring system may determine a quantity of attempts made by unauthorized users to access the project and/or the file, a quantity of attempts made by authorized users to access the project and/or the file, and/or the like based on metadata recorded by a client device (e.g., an IDE agent).

As further shown in FIG. 3B, the report may include information identifying a risk associated with a project. The monitoring system may determine the risk associated with a project based on a quantity of times files associated with the project violated one or more rules, a quantity of attempts made by unauthorized users to access the project, and/or the like.

In some implementations, the report may include information identifying a percentage of a file, and/or a portion of the file, that has been included in another file and/or a quantity of times the file, or the portion of the file, has been included in another file. In some implementations, the monitoring system may determine the percentage and/or the quantity of times based on comparing the digital DNA signature and/or the digital identifier to another digital DNA signature and/or another digital identifier. The monitoring system may determine a similarity between the digital DNA signature and the other digital DNA signature and/or a similarity between the digital identifier and the other digital identifier. The monitoring system may determine that the file, or the portion of the file, is included in a file associated with the other digital DNA signature and/or the other digital identifier when the similarity satisfies a threshold similarity.

As indicated above, FIGS. 3A-3B are provided as an example. Other examples may differ from what is described with regard to FIGS. 3A-3B. The number and arrangement of devices shown in FIGS. 3A-3B are provided as an example. In practice, there may be additional devices, fewer devices, different devices, or differently arranged devices than those shown in FIGS. 3A-3B. Furthermore, two or more devices shown in FIGS. 3A-3B may be implemented within a single device, or a single device shown in FIGS. 3A-3B may be implemented as multiple, distributed devices. Additionally, or alternatively, a set of devices (e.g., one or more devices) shown in FIGS. 3A-3B may perform one or more functions described as being performed by another set of devices shown in FIGS. 3A-3B.

Figure 4:
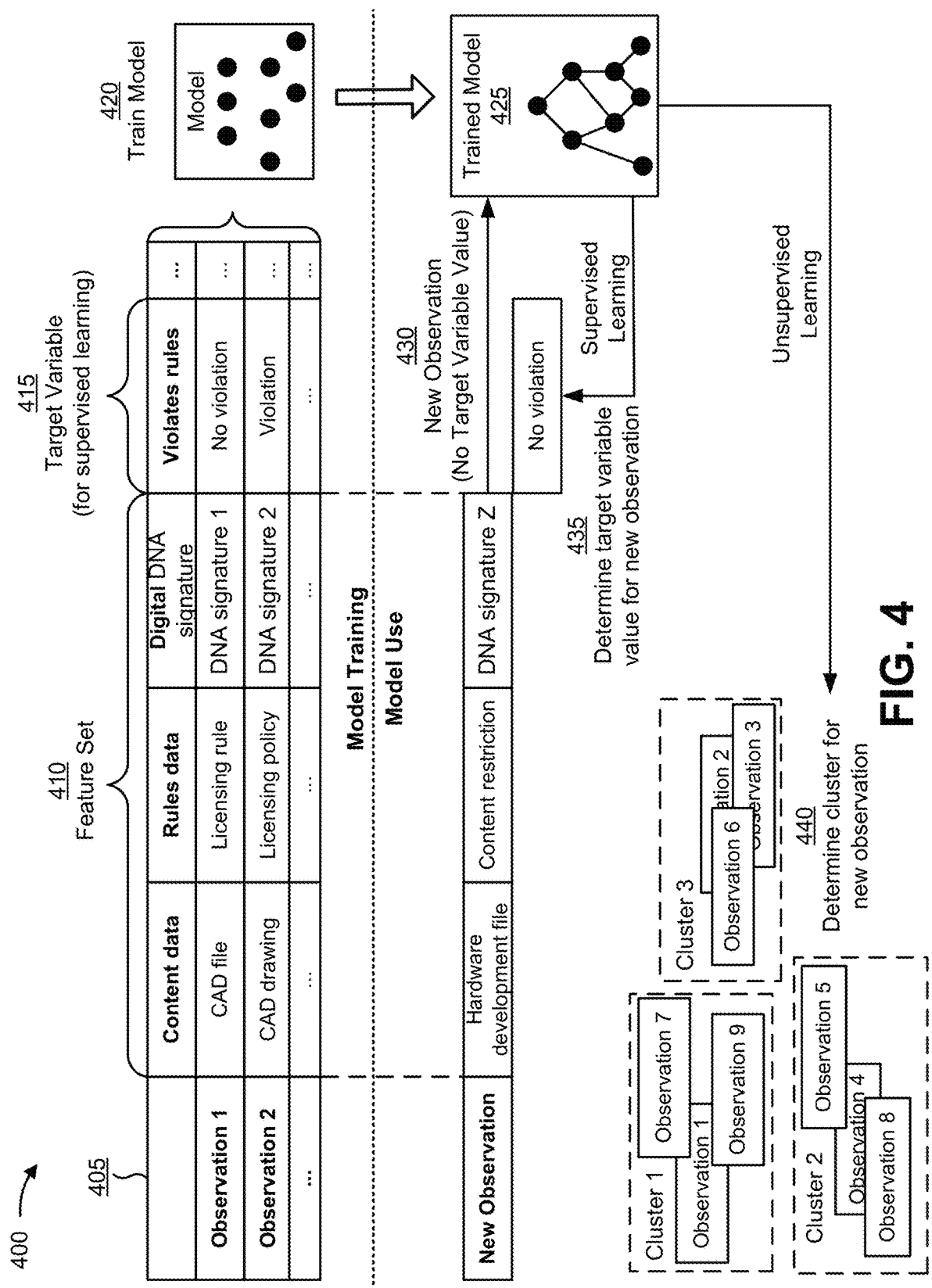
FIG. 4 is a diagram illustrating an example of training and using a machine learning model in connection with preventing intellectual property issues for content during different stages of a project lifecycle.

FIG. 4 is a diagram illustrating an example 400 of training and using a machine learning model in connection with preventing intellectual property issues for content during different stages of a project lifecycle. The machine learning model training and usage described herein may be performed using a machine learning system. The machine learning system may include or may be included in a computing device, a server, a cloud computing environment, and/or the like, such as the monitoring system described in more detail elsewhere herein.

As shown by reference number 405, a machine learning model may be trained using a set of observations. The set of observations may be obtained from historical data, such as data gathered during one or more processes described herein. In some implementations, the machine learning system may receive the set of observations (e.g., as input) from the monitoring system, as described elsewhere herein.

As shown by reference number 410, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from monitoring system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of content data, a second feature of rules data, a third feature of digital DNA signature, and so on. As shown, for a first observation, the first feature may have a value of CAD file, the second feature may have a value of licensing rule, the third feature may have a value of fingerprint 1, and so on. These features and feature values are provided as examples, and may differ in other examples.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 400, the target variable is Violates Rules, which has a value of no violation for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include a first feature of hardware development file, a second feature of content restriction, a third feature of fingerprint Z, and so on, as an example. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 425 may predict a value of no violation for the target variable of violates rules for the new observation, as shown by reference number 435. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a recommendation to allow a file to be stored on a device included in a content management environment, a recommendation to permit a file to be compiled, a recommendation to schedule a job for execution, and/or the like. The first automated action may include, for example, automatically storing a file on a device included in a content management environment, automatically compiling a file, automatically scheduling a job for execution, and/or the like.

As another example, if the machine learning system were to predict a value of violation for the target variable of violates, then the machine learning system may provide a second (e.g., different) recommendation (e.g., a recommendation to not allow a file to be stored on a device included in a content management environment, a recommendation to not permit a file to be compiled, a recommendation to not schedule a job for execution, and/or the like) and/or may perform or cause performance of a second (e.g., different) automated action (e.g., automatically preventing a file from being stored on a device included in a content management environment, automatically preventing a file from being compiled, automatically preventing a job to be scheduled for execution, and/or the like).

In some implementations, the trained machine learning model 425 may classify (e.g., cluster) the new observation in a cluster, as shown by reference number 440. The observations within a cluster may have a threshold degree of similarity. As an example, if the machine learning system classifies the new observation in a first cluster (e.g., a no violation cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a violation cluster), then the machine learning system may provide a second (e.g., different) recommendation (e.g., the second recommendation described above) and/or may perform or cause performance of a second (e.g., different) automated action, such as the second automated action described above.

As another example, if the machine learning system were to classify the new observation in a third cluster (e.g., a possible violation cluster), then the machine learning system may provide a third (e.g., different) recommendation (e.g., a recommendation that further analysis is required to determine whether a file violates a rule, a recommendation to obtain additional data associated with determining whether a file violates a rule, and/or the like) and/or may perform or cause performance of a second (e.g., different) automated action, such as automatically scheduling a file for additional analysis, automatically performing additional analysis to determine whether a file violates a rule, and/or the like.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to preventing intellectual property issues for content during different stages of a project lifecycle. The machine learning system enables recognition and/or identification of tens, hundreds, thousands, or millions of features and/or feature values for tens, hundreds, thousands, or millions of observations, thereby increasing accuracy and consistency and reducing delay associated with preventing intellectual property issues for content during different stages of a project lifecycle relative to requiring computing resources to be allocated for tens, hundreds, or thousands of operators to manually identifying intellectual property issues for content during different stages of a project lifecycle using the features or feature values.

As indicated above, FIG. 4 is provided as an example. Other examples may differ from what is described in connection with FIG. 4.

Figure 5:
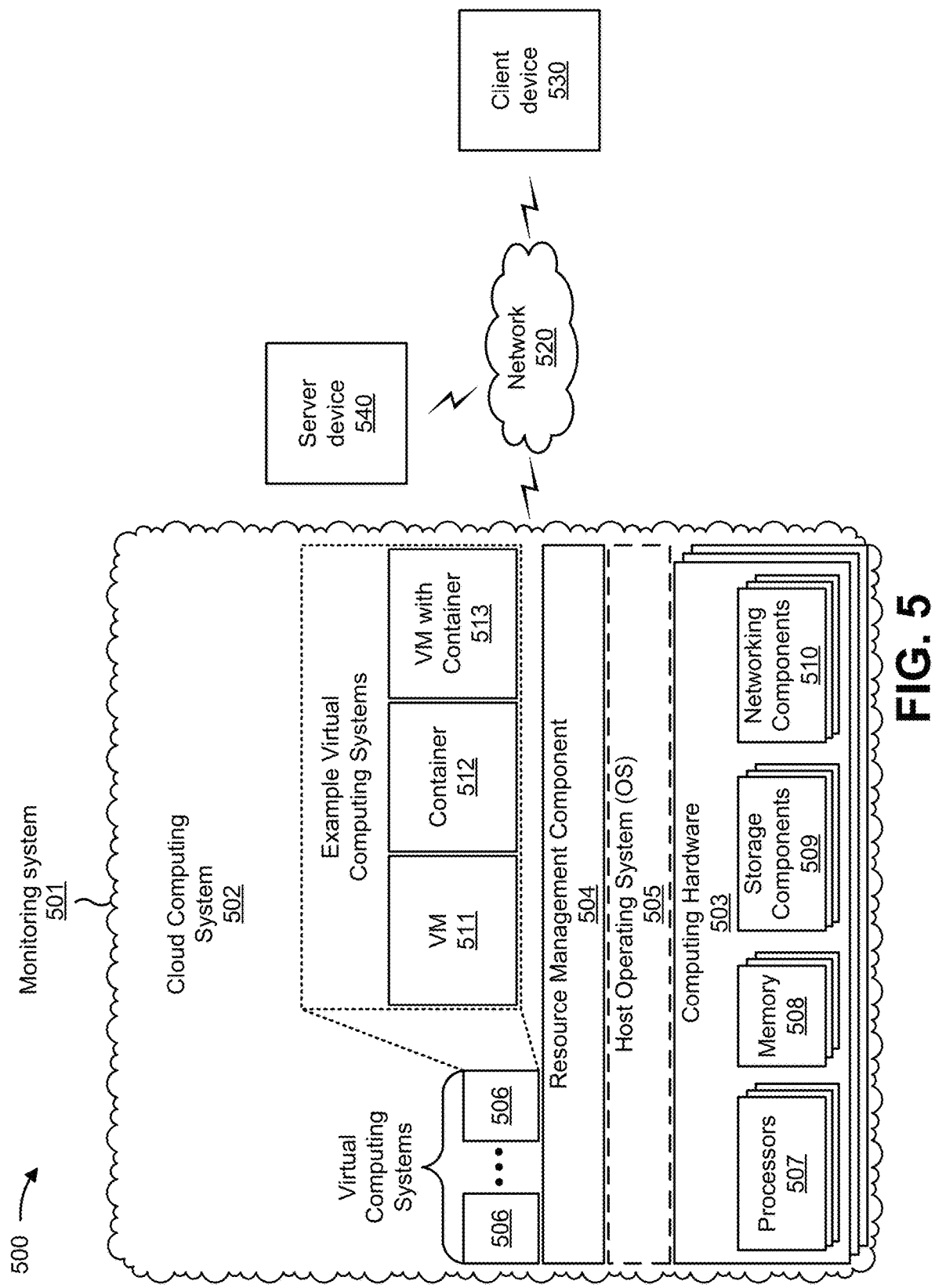
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a monitoring system 501, which may include one or more elements of and/or may execute within a cloud computing system 502. The cloud computing system 502 may include one or more elements 503-513, as described in more detail below. As further shown in FIG. 5, environment 500 may include a network 520, a client device 530, and/or a server device 540. Devices and/or elements of environment 500 may interconnect via wired connections and/or wireless connections.

The cloud computing system 502 includes computing hardware 503, a resource management component 504, a host operating system (OS) 505, and/or one or more virtual computing systems 506. The resource management component 504 may perform virtualization (e.g., abstraction) of computing hardware 503 to create the one or more virtual computing systems 506. Using virtualization, the resource management component 504 enables a single computing device (e.g., a computer, a server, and/or the like) to operate like multiple computing devices, such as by creating multiple isolated virtual computing systems 506 from computing hardware 503 of the single computing device. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server) or from multiple computing devices (e.g., multiple servers), such as multiple computing devices in one or more data centers. As shown, computing hardware 503 may include one or more processors 507, one or more memories 508, one or more storage components 509, and/or one or more networking components 510. Examples of a processor, a memory, a storage component, and a networking component (e.g., a communication component) are described elsewhere herein.

The resource management component 504 includes a virtualization application (e.g., executing on hardware, such as computing hardware 503) capable of virtualizing computing hardware 503 to start, stop, and/or manage one or more virtual computing systems 506. For example, the resource management component 504 may include a hypervisor (e.g., a bare-metal or Type 1 hypervisor, a hosted or Type 2 hypervisor, and/or the like) or a virtual machine monitor, such as when the virtual computing systems 506 are virtual machines 511. Additionally, or alternatively, the resource management component 504 may include a container manager, such as when the virtual computing systems 506 are containers 512. In some implementations, the resource management component 504 executes within and/or in coordination with a host operating system 505.

A virtual computing system 506 includes a virtual environment that enables cloud-based execution of operations and/or processes described herein using computing hardware 503. As shown, a virtual computing system 506 may include a virtual machine 511, a container 512, a hybrid environment 513 that includes a virtual machine and a container, and/or the like. A virtual computing system 506 may execute one or more applications using a file system that includes binary files, software libraries, and/or other resources required to execute applications on a guest operating system (e.g., within the virtual computing system 506) or the host operating system 505.

Although the monitoring system 501 may include one or more elements 503-513 of the cloud computing system 502, may execute within the cloud computing system 502, and/or may be hosted within the cloud computing system 502, in some implementations, the monitoring system 501 may not be cloud-based (e.g., may be implemented outside of a cloud computing system) or may be partially cloud-based. For example, the monitoring system 501 may include one or more devices that are not part of the cloud computing system 502, such as device 600 of FIG. 6, which may include a standalone server or another type of computing device. The monitoring system 501 may perform one or more operations and/or processes described in more detail elsewhere herein.

Network 520 includes one or more wired and/or wireless networks. For example, network 520 may include a cellular network, a public land mobile network (PLMN), a local area network (LAN), a wide area network (WAN), a private network, the Internet, and/or the like, and/or a combination of these or other types of networks. The network 520 enables communication among the devices of environment 500.

Client device 530 includes one or more devices capable of receiving, generating, storing, processing, and/or providing information associated with preventing intellectual property issues for content during different stages of a project lifecycle, as described elsewhere herein. Client device 530 may include a communication device and/or a computing device. For example, client device 530 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Client device 530 may communicate with one or more other devices of environment 500, as described elsewhere herein.

Server device 540 includes one or more devices capable of receiving, generating, storing, processing, providing, and/or routing information associated with preventing intellectual property issues for content during different stages of a project lifecycle, as described elsewhere herein. Server device 540 may include a communication device and/or a computing device. For example, server device 540 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 540 may communicate with one or more other devices of environment 500, as described elsewhere herein.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
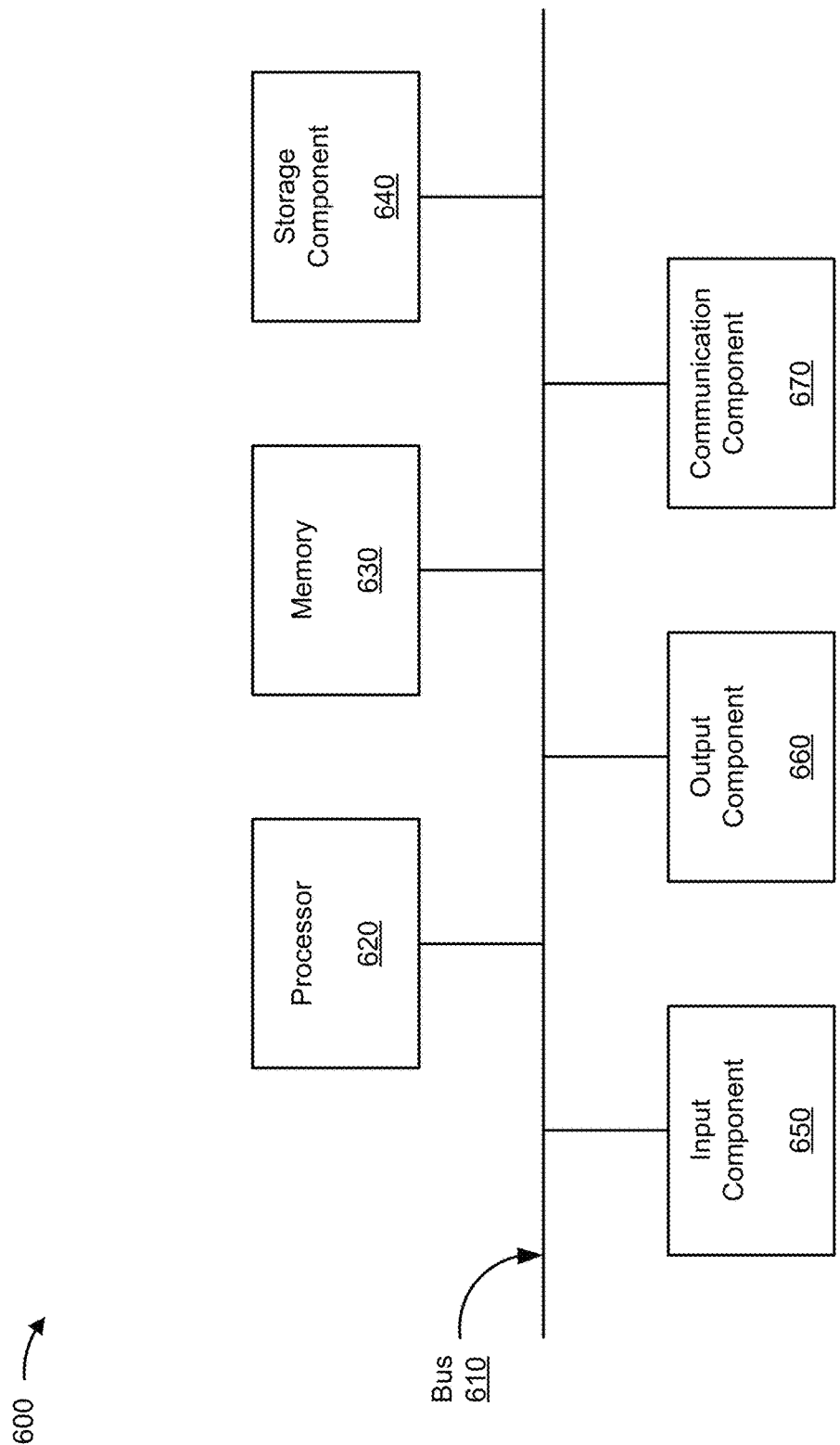
FIG. 6 is a diagram of example components of one or more devices of FIG. 5.

FIG. 6 is a diagram of example components of a device 600, which may correspond to monitoring system 501, client device 530, and/or server device 540. In some implementations, monitoring system 501, client device 530, and/or server device 540 may include one or more devices 600 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory), a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, an actuator, and/or the like. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, an antenna, and/or the like.

Device 600 may perform one or more processes described herein. For example, a non-transitory computer-readable medium (e.g., memory 630 and/or storage component 640) may store a set of instructions (e.g., one or more instructions, code, software code, program code, and/or the like) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
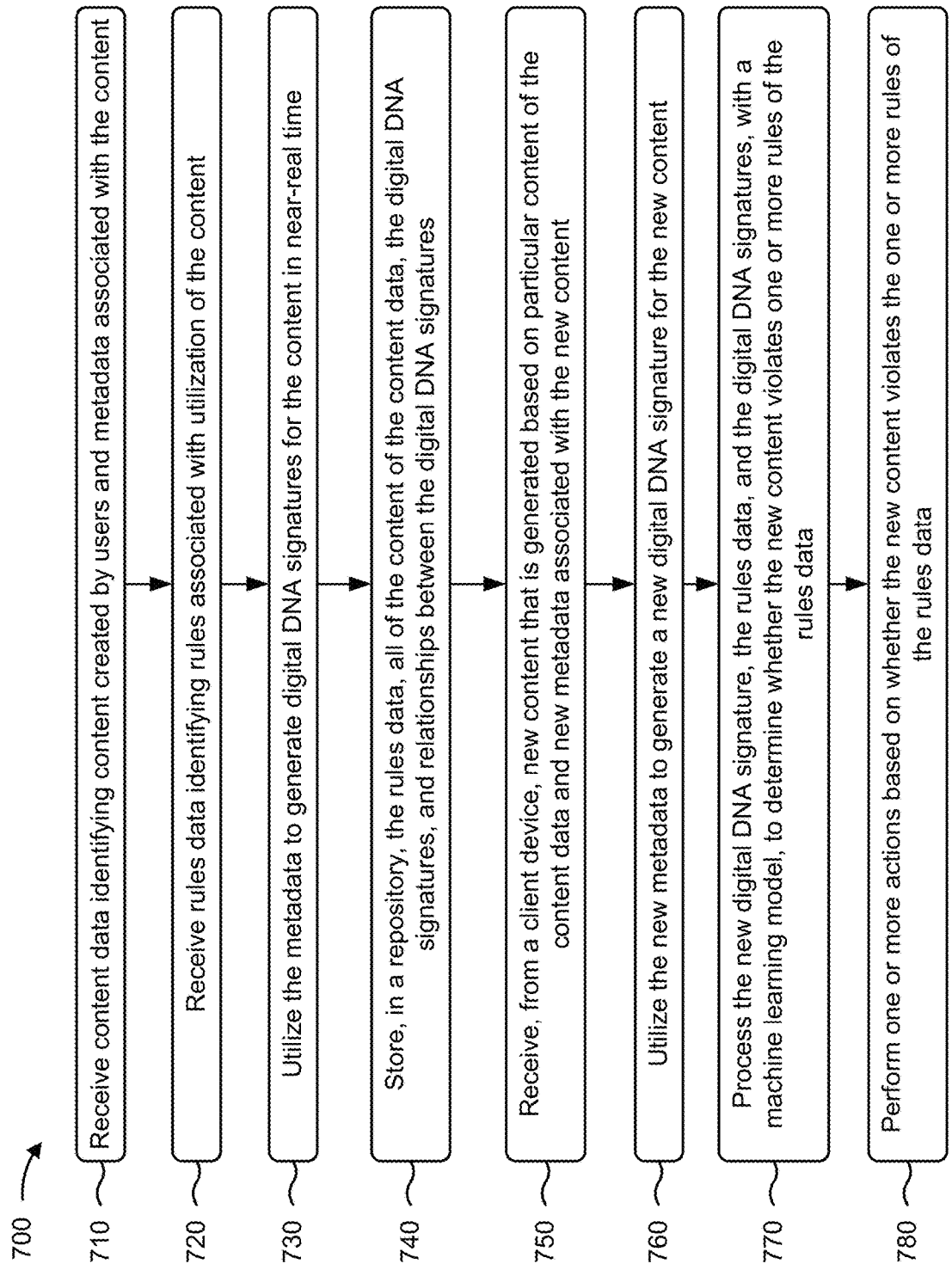
FIG. 7 is a flow chart of example processes relating to utilizing machine learning to prevent intellectual property issues for content during different stages of a project lifecycle.

FIG. 7 is a flowchart of an example process 700 associated with utilizing machine learning to prevent intellectual property issues for content during different stages of a project lifecycle. In some implementations, one or more process blocks of FIG. 7 may be performed by a device (e.g., monitoring system 501). In some implementations, one or more process blocks of FIG. 7 may be performed by another device or a group of devices separate from or including the device, such as a client device (e.g., client device 530), a server device (e.g., server device 540), and/or the like. Additionally, or alternatively, one or more process blocks of FIG. 7 may be performed by one or more components of a device 600, such as processor 620, memory 630, storage component 640, input component 650, output component 660, communication component 670, and/or the like.

As shown in FIG. 7, process 700 may include receiving content data identifying content created by users and metadata associated with the content (block 710). For example, the device may receive content data identifying content created by users and metadata associated with the content, as described above.

As further shown in FIG. 7, process 700 may include receiving rules data identifying rules associated with utilization of the content (block 720). For example, the device may receive rules data identifying rules associated with utilization of the content, as described above.

As further shown in FIG. 7, process 700 may include utilizing the metadata to generate digital DNA signatures for the content in near-real time (block 730). For example, the device may utilize the metadata to generate digital DNA signatures for the content in near-real time, as described above.

As further shown in FIG. 7, process 700 may include storing, in a repository, the rules data, all of the content of the content data, the digital DNA signatures, and relationships between the digital DNA signatures (block 740). For example, the device may store, in a repository, the rules data, all of the content of the content data, the digital DNA signatures, and relationships between the digital DNA signatures, as described above. In some implementations, the device may utilize the metadata and the content data to generate digital identifiers for the content; and may associate the digital identifiers with corresponding digital DNA signatures stored in the repository to permit a further factor in a determination of whether the new content violates the one or more rules.

As further shown in FIG. 7, process 700 may include receiving, from a client device, new content that is generated based on particular content of the content data and new metadata associated with the new content (block 750). For example, the device may receive, from a client device, new content that is generated based on particular content of the content data and new metadata associated with the new content, as described above. The new content may include a new file created from an existing file of the content data, a file created by copying and adding data from an existing file of the content data, and/or the like.

As further shown in FIG. 7, process 700 may include utilizing the new metadata to generate a new digital DNA signature for the new content (block 760). For example, the device may utilize the new metadata to generate a new digital DNA signature for the new content, as described above. The new digital DNA signature may include a digital DNA signature corresponding to the particular content of the content data.

As further shown in FIG. 7, process 700 may include processing the new digital DNA signature, the rules data, and the digital DNA signatures, with a machine learning model, to determine whether the new content violates one or more rules of the rules data (block 770). For example, the device may process the new digital DNA signature, the rules data, and the digital DNA signatures, with a machine learning model, to determine whether the new content violates one or more rules of the rules data, as described above. In some implementations, processing the new digital DNA signature, the rules data, and the digital DNA signatures, with the machine learning model, to determine whether the new content violates one or more rules of the rules data includes utilizing a file-level digital DNA signature mechanism to determine whether the new content violates the one or more rules of the rules data.

As further shown in FIG. 7, process 700 may include performing one or more actions based on whether the new content violates the one or more rules of the rules data (block 780). For example, the device may perform one or more actions based on whether the new content violates the one or more rules of the rules data, as described above.

In some implementations, the one or more actions are to prevent intellectual property issues for the new content during different stages of a project lifecycle for the new content. For example, performing the one or more actions may include one or more of: causing the new content to be corrected when the new content violates the one or more rules; allowing the new content to be utilized when the new content fails to violate the one or more rules; or providing, to the client device, a warning indicating that the new content violates the one or more rules. Alternatively, and/or additionally, performing the one or more actions includes one or more of: providing, to an entity associated with the client device, a notification indicating that the new content violates the one or more rules; restricting utilization of the new content when the new content violates the one or more rules; storing the new content in the repository when the new content fails to violate the one or more rules; or retraining the machine learning model based on whether the new content violates the one or more rules.

In some implementations, performing the one or more actions includes determining one or more analytics based on whether the new content violates the one or more rules; generating a user interface based on the one or more analytics; and providing the user interface for display.

In some implementations, the new content is associated with initiation of a software project, the rules data includes data identifying a classification, licensing information, and import-export constraints associated with the software project, and performing the one or more actions comprises: selectively causing the new content to be corrected or allowing the new content to be utilized based on whether the new content violates the data identifying the classification, the licensing information, or the import-export constraints associated with the software project.

In some implementations, the new content is associated with planning of a software project, the rules data includes data identifying imported and declared intellectual property dependencies associated with the software project, and performing the one or more actions comprises: selectively causing the new content to be corrected or allowing the new content to be utilized based on whether the new content violates the data identifying the imported and declared intellectual property dependencies associated with the software project.

In some implementations, the new content is associated with development of a software project, the rules data includes data identifying a classification, external dependencies, and licensing information associated with the software project, and performing the one or more actions include one or more of updating the classification when the new content violates the data identifying the classification associated with the software project; declaring the external dependencies when the new content fails to violate the data identifying the external dependencies associated with the software project; or acquiring a license when the new content violates the data identifying the licensing information associated with the software project.

In some implementations, the new content is associated with releasing a software project, the rules data includes data identifying an intellectual property policy compliance associated with the software project, and performing the one or more actions includes selectively allowing or rejecting the software project based on whether the new content violates the data identifying the intellectual property policy compliance associated with the software project.

In some implementations, the new content is associated with closing a software project, and performing the one or more actions includes identifying the software project as an internal asset for an entity, as a public asset, or as a restricted asset when the new content fails to violate the one or more rules.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a device, content data identifying content created by users and metadata associated with the content,
    wherein the content created by the users includes one or more of:
      lines of code, or
      an object designed by a user;
  receiving, by the device, rules data identifying rules associated with utilization of the content;
  utilizing, by the device, the metadata to generate digital DNA signatures for the content in near-real time,
    wherein a digital DNA signature of the digital DNA signatures includes:
      information that uniquely identifies the content, and information that enables the device to determine whether a portion of the content is included in other content;
processing, by the device, the content data, the rules data, the digital DNA signatures, and relationships between the digital DNA signatures, with a machine learning model, to determine a set of variables associated with a set of observations of the machine learning model;
storing, by the device and in a repository, the rules data, all of the content of the content data, the digital DNA signatures, the relationships between the digital DNA signatures, and the set of variables;
providing, by the device and to a client device, a template, associated with the digital DNA signature, based on particular content of the content data;
receiving, by the device and from the client device, new content that is generated based on the template and new metadata associated with the new content;
utilizing, by the device, the new metadata to generate a new digital DNA signature for the new content;
processing, by the device, the new digital DNA signature, the rules data, the digital DNA signatures, and the set of variables, with the machine learning model, to determine a predicted value, of a target variable associated with the set of variables, indicating whether the new content violates one or more rules of the rules data, wherein processing the digital DNA signatures, and the set of variables with the machine learning model, comprises:
determining, based on using the machine learning model, whether the new digital DNA signature includes the digital DNA signature, and
determining, based on using the machine learning model, information identifying a relationship between the new content and the template; and
performing, by the device, one or more actions based on whether the new content violates the one or more rules of the rules data.

2. The method of claim 1, wherein the one or more actions are to prevent intellectual property issues for the new content during different stages of a project lifecycle for the new content.

3. The method of claim 1, wherein performing the one or more actions includes one or more of:
causing the new content to be corrected when the new content violates the one or more rules;
allowing the new content to be utilized when the new content fails to violate the one or more rules; or
providing, to the client device, a warning indicating that the new content violates the one or more rules.

4. The method of claim 1, wherein performing the one or more actions includes one or more of:
providing, to an entity associated with the client device, a notification indicating that the new content violates the one or more rules;
restricting utilization of the new content when the new content violates the one or more rules;
storing the new content in the repository when the new content fails to violate the one or more rules; or
retraining the machine learning model based on whether the new content violates the one or more rules.

5. The method of claim 1, further comprising:
utilizing the metadata and the content data to generate digital identifiers for the content; and
associating the digital identifiers with corresponding digital DNA signatures stored in the repository to permit a further factor in a determination of whether the new content violates the one or more rules.

6. The method of claim 1, wherein the new content is associated with initiation of a software project, the rules data includes data identifying a classification, licensing information, and import-export constraints associated with the software project, and
wherein performing the one or more actions comprises:
selectively causing the new content to be corrected or allowing the new content to be utilized based on whether the new content violates the data identifying the classification, the licensing information, or the import-export constraints associated with the software project.

7. The method of claim 1, wherein the new content is associated with planning of a software project, the rules data including data identifying imported and declared intellectual property dependencies associated with the software project, and
wherein performing the one or more actions comprises:
selectively causing the new content to be corrected or allowing the new content to be utilized based on whether the new content violates the data identifying the imported and declared intellectual property dependencies associated with the software project.

8. A device, comprising:
one or more memories; and
one or more processors, coupled to the one or more memories, configured to:
receive content data identifying content created by users and metadata associated with the content,
wherein the content created by the users includes one or more of:
lines of code, or
an object designed by a user;
receive rules data identifying rules associated with utilization of the content;
utilize the metadata to generate digital DNA signatures for the content in near-real time;
utilize the metadata and the content data to generate digital identifiers for the content,
wherein a digital DNA signature of the digital DNA signatures includes:
information that uniquely identifies the content, and
information that enables the one or more processors to determine whether a portion of the content is included in other content;
associate the digital identifiers with corresponding digital DNA signatures;
process the content data, the rules data, the digital DNA signatures, and the digital identifiers, with a machine learning model, to determine a set of variables associated with a set of observations of the machine learning model;
store, in a repository, the rules data, all of the content of the content data, the digital DNA signatures, the digital identifiers, and the set of variables;
provide, to a client device, a template, associated with the digital DNA signature, based on particular content of the content data;
receive, from the client device, new content that is generated based on the template and new metadata associated with the new content;
utilize the new metadata to generate a new digital DNA signature for the new content;

process the new digital DNA signature, the rules data, the digital DNA signatures, the digital identifiers, and the set of variables, with the machine learning model, to determine a predicted value, of a target variable associated with the set of variables, whether the new content violates one or more rules of the rules data,
wherein the one or more processors, to process the digital DNA signatures, the rules data, the digital DNA signatures, the digital identifiers, and the set of variables with the machine learning model, are configured to:
determine, based on using the machine learning model, whether the new digital DNA signature includes the digital DNA signature, and
determine, based on using the machine learning model, information identifying a relationship between the new content and the template; and
perform one or more actions based on whether the new content violates the one or more rules of the rules data.

9. The device of claim 8, wherein the new content is associated with development of a software project, the rules data includes data identifying a classification, external dependencies, and licensing information associated with the software project, and
wherein the one or more processors, to perform the one or more actions, are configured to one or more of:
update the classification when the new content violates the data identifying the classification associated with the software project;
declare the external dependencies when the new content fails to violate the data identifying the external dependencies associated with the software project; or
acquire a license when the new content violates the data identifying the licensing information associated with the software project.

10. The device of claim 8, wherein the new content is associated with releasing a software project, the rules data includes data identifying an intellectual property policy compliance associated with the software project, and
wherein the one or more processors, to perform the one or more actions, are configured to:
selectively allow or reject the software project based on whether the new content violates the data identifying the intellectual property policy compliance associated with the software project.

11. The device of claim 8, wherein the new content is associated with closing a software project, and
wherein the one or more processors, to perform the one or more actions, are configured to:
identify the software project as an internal asset for an entity, as a public asset, or as a restricted asset when the new content fails to violate the one or more rules.

12. The device of claim 8, wherein the new content includes one of:
a new file created from an existing file of the content data, or
a file created by copying and adding data from an existing file of the content data.

13. The device of claim 8, wherein the new digital DNA signature includes a digital DNA signature corresponding to the particular content of the content data.

14. The device of claim 8, wherein the one or more processors, to perform the one or more actions, are configured to:

determine one or more analytics based on whether the new content violates the one or more rules;
generate a user interface based on the one or more analytics; and
provide the user interface for display.

15. A non-transitory computer-readable medium storing instructions, the instructions comprising:
one or more instructions that, when executed by one or more processors, cause the one or more processors to:
store, in a repository:
content data identifying content and metadata associated with the content,
wherein the content includes one or more of:
lines of code, or
an object designed by a user,
rules data identifying rules associated with utilization of the content,
digital DNA signatures, for the content, that are generated in near-real time based on the metadata,
wherein a digital DNA signature of the digital DNA signatures includes:
information that uniquely identifies the content, and
information that enables the one or more processors to determine whether a portion of the content is included in other content, and
a set of variables associated with a set of observations and a machine learning model;
provide, to a client device, a template, associated with the digital DNA signature, based on particular content of the content data;
receive, from the client device, new content that is generated based on the template and new metadata associated with the new content;
utilize the new metadata to generate a new digital DNA signature for the new content;
process the new digital DNA signature, the rules data, the digital DNA signatures, and the set of variables, with the machine learning model, to determine a predicted value, of a target variable associated with the set of variables, indicating whether the new content violates one or more rules of the rules data,
wherein the one or more instructions, that cause the one or more processors to process the digital DNA signatures, the rules data, the digital DNA signatures, and the set of variables with the machine learning model, are configured to:
determine, based on using the machine learning model, whether the new digital DNA signature includes the digital DNA signature, and
determine, based on using the machine learning model, information identifying a relationship between the new content and the template; and
perform one or more actions based on whether the new content violates the one or more rules of the rules data.

16. The non-transitory computer-readable medium of claim 15, wherein the one or more instructions, that cause the one or more processors to perform the one or more actions, cause the one or more processors to one or more of:
cause the new content to be corrected when the new content violates the one or more rules;
allow the new content to be utilized when the new content fails to violate the one or more rules;
provide, to the client device, a warning indicating that the new content violates the one or more rules;

provide, to an entity associated with the client device, a notification indicating that the new content violates the one or more rules;
restrict utilization of the new content when the new content violates the one or more rules;
store the new content in the repository when the new content fails to violate the one or more rules; or
retrain the machine learning model based on whether the new content violates the one or more rules.

17. The non-transitory computer-readable medium of claim 15, wherein the one or more instructions, that cause the one or more processors to process the new digital DNA signature, the rules data, and the digital DNA signatures, with the machine learning model, cause the one or more processors to:
utilize a file-level digital DNA signature mechanism to determine whether the new content violates the one or more rules of the rules data.

18. The non-transitory computer-readable medium of claim 15, wherein the instructions further comprise:
one or more instructions that, when executed by the one or more processors, cause the one or more processors to:
utilize the metadata and the content data to generate digital identifiers for the content;
associate the digital identifiers with corresponding digital DNA signatures stored in the repository; and
utilize the digital identifiers to determine whether the new content violates the one or more rules.

19. The non-transitory computer-readable medium of claim 15, wherein the one or more instructions, that cause the one or more processors to perform the one or more actions, cause the one or more processors to:
determine one or more analytics based on whether the new content violates the one or more rules of the rules data;
generate a user interface based on the one or more analytics; and
provide the user interface for display.

20. The non-transitory computer-readable medium of claim 15, wherein the new content is associated with closing a software project, and the one or more instructions, that cause the one or more processors to perform the one or more actions, cause the one or more processors to:
identify the software project as an internal asset for an entity, as a public asset, or as a restricted asset when the new content violates the one or more rules of the rules data.

* * * * *